United States Patent [19]
Ichikawa et al.

[11] Patent Number: 5,675,317
[45] Date of Patent: Oct. 7, 1997

[54] RESIDUAL PRESSURE SENSOR AND RESIDUAL PRESSURE SENSOR MONITORING APPARATUS

[75] Inventors: Masato Ichikawa, Tokyo; Koichi Futsuhara; Masayoshi Sakai, both of Saitama-ken, all of Japan

[73] Assignees: Nagano Keiki Seisakusho, Ltd.; The Nippon Signal Co., Ltd., both of Japan

[21] Appl. No.: 591,444

[22] PCT Filed: May 30, 1994

[86] PCT No.: PCT/JP94/00858

§ 371 Date: Jan. 29, 1996

§ 102(e) Date: Jan. 29, 1996

[87] PCT Pub. No.: WO95/33190

PCT Pub. Date: Dec. 7, 1995

[51] Int. Cl.$^6$ .................. G08B 29/00; G01L 9/00
[52] U.S. Cl. .............. 340/507; 340/555; 340/626; 73/705; 73/732; 73/733
[58] Field of Search .................. 340/507, 506, 340/555, 556, 614, 626; 73/861.02, 732, 733, 734, 705, 742, 861.64; 364/184–186, 558

[56] References Cited

U.S. PATENT DOCUMENTS

| | | | |
|---|---|---|---|
| 3,742,233 | 6/1973 | Gorgens et al. | |
| 4,599,902 | 7/1986 | Gray | 73/705 |
| 4,661,880 | 4/1987 | Futsuhara | 361/93 |
| 4,938,062 | 7/1990 | Shimizu et al. | 73/705 |
| 5,027,114 | 6/1991 | Kawashima et al. | 340/941 |
| 5,138,155 | 8/1992 | Gray | 73/705 |
| 5,296,750 | 3/1994 | Bozeman, Jr. | 307/308 |
| 5,440,234 | 8/1995 | Kondo | 340/650 |

FOREIGN PATENT DOCUMENTS

| | | |
|---|---|---|
| 56-170741 | 12/1981 | Japan. |
| 57-19443 | 2/1982 | Japan. |
| 58-60233 | 9/1983 | Japan. |
| 61-139453 | 8/1986 | Japan. |
| 6-288849 | 10/1994 | Japan. |
| 6-307952 | 11/1994 | Japan. |

OTHER PUBLICATIONS

Kato et al., "LSI Implementation and Safety Verification of Window Comparator Used in Fail–Safe Multiple–Valued Logic Operations", IEICE Trans. Electron., E76–C(3) :419–427 Mar. 1993.

Kato et al., "Construction of Magnetic Sensors for Assuring Safety", Ergonomics of Hybrid Automated Systems II, pp. 913–920, Jan. 1990.

*Primary Examiner*—Donnie L. Crosland

[57] ABSTRACT

A residual pressure sensor for verifying that a residual pressure is zero, and to a monitoring apparatus for monitoring for faults in the residual pressure sensor. In order to detect that a residual pressure has completely gone, the residual pressure sensor detects change conditions in the output therefrom, and an output for no residual pressure is not generated while there are changes. Moreover, an electrical power supply condition to a drive solenoid (21) of a solenoid valve for opening/closing a pressure supply line, is monitored using a fail-safe current sensor (21) which outputs a logic value "0" when the presence of a current is detected, and which outputs a logic value "1" when the presence of a current is not detected. Fault monitoring of the residual pressure sensor is then carried out based on the monitoring output conditions of the current sensor and the output conditions of the residual pressure sensor.

23 Claims, 15 Drawing Sheets

| $\overline{I}$ | $\overline{F1}$ | $F3 = \overline{I} + \overline{F1}$ |
|---|---|---|
| 0 | 1 | 1 |
| 0 | 0 | 0 |
| 1 | 1 | 2 |
| 1 | 0 | 1 |

RESIDUAL PRESSURE SENSOR AND RESIDUAL PRESSURE SENSOR MONITORING APPARATUS

TECHNICAL FIELD

The present invention relates to a residual pressure sensor which uses a Bourdon tube to detect a drop in pressure. In particular the invention relates to a residual pressure sensor which is suitable for guard systems such as those covered under Chapter 9 of British Standard BS 5304, for fail-safe verification of stoppage of drive power to hydraulically powered machinery. Moreover, the present invention relates to a residual pressure sensor monitoring apparatus for monitoring if a residual pressure sensor is normal or abnormal.

BACKGROUND ART

In cases for example wherein maintenance work is carried out with a movable section of a machine in a holding condition, or with operations wherein a movable section of the machine and an operator co-operate alternately, safety measures to protect the operator from accidents are extremely important. In the case of hydraulically powered machinery for example, safety measures can be taken involving a method wherein an operator is permitted to approach close to a movable section of a machine only after verifying that the pressure source has been cut off and that pressure is not being supplied to the movable section of the machine. In this case, a safety system can be considered wherein the presence or absence of a pressure supply to the movable section of the machine is monitored for example by a residual pressure sensor, and the operator is warned by the display of a lamp or the like.

As a pressure detection sensor suitable for such types of safety systems, there is the residual pressure sensor previously proposed by the present inventors in Japanese Unexamined Patent Publication No. 6-307952.

This residual pressure sensor has a pressure sensing pipe (Bourdon tube) bent into an approximate C-shape, with a closed end, which is displaced in proportion to the introduced pressure, provided with a plate having a slit. Moreover, the construction involves a photocoupler comprising mutually opposed light emitting and light receiving elements arranged with the plate therebetween, with an output from the photocoupler and clamped at a power source voltage and rectified by means of a voltage doubler rectifying circuit.

In operation, the pressure sensing pipe is communicatively connected to a pressure supply pipe for supplying pressure from a pressure source to a movable section of a machine. In this condition, when there is no pressure in the pressure supply pipe so that the pressure introduced to the pressure sensing pipe is practically zero, the closed end of the pressure sensing pipe is not displaced, and an alternating current light beam from a light emitting element which is driven by an alternating current signal from a signal generator, is received by the light receiving element via the slit of the plate. As a result, an alternating current output is generated from the photocoupler, so that an electrical output signal of a higher level condition (logic value "1") than the power source voltage, is generated from the voltage doubler rectifying circuit, and a display lamp illuminated to indicate no pressure (movable section of the machine stopped).

On the other hand, when there is a pressure supply to the movable section of the machine so that the movable section of the machine is in a drive condition, pressure is also introduced into the pressure sensing pipe, displacing the closed end thereof in proportion to the introduced pressure. Due to this closed end displacement, the plate is also displaced, shutting off the light beam projected from the light emitting element towards the light receiving element. As a result, an alternating current output signal is not generated from the photocoupler, and hence the output of a higher level than the power source voltage is not generated from the voltage doubler rectifying circuit (the rectifying circuit output becomes a low level condition of logic value "0"), so that the display lamp does not come on, thus indicating a pressure (movable section of the machine movable).

With this residual pressure sensor, since at the time of a fault the output from the output terminal of the rectifying circuit is in the same form (logic value "0") as that for a pressure (corresponding to a danger condition), the construction is fail-safe.

However, with the abovementioned residual pressure sensor, when the pressure supply to the movable section of the machine is stopped, the closed end of the pressure sensing pipe is gradually displaced with the drop in pipe pressure. In this case, during the displacement of the pressure sensing pipe, the light from the light emitting element leaks through the slit of the plate on the tip of the pressure sensing pipe with movement of the plate, and at the point when the light received level of the light receiving elements exceeds a certain amount, an output for a high level condition of no pressure is generated from the rectifying circuit. There is thus the problem that an output for no residual pressure is produced before the residual pressure in the pressure sensing pipe is completely zero.

With a system for monitoring the residual pressure of a movable section of a machine using such a residual pressure sensor, then in the case wherein the pressure inlet for example of the pressure sensing pipe of the residual pressure sensor becomes blocked with foreign matter so that pressure cannot be introduced thereto, then a display for no pressure continues. In this case there is thus the problem that a no pressure display (safety), indicating safety to the operator, is given even though pressure is being supplied to the movable section of the machine. Accordingly, with such a system it is extremely important as a safety measure to monitor for faults in the residual pressure sensor.

As a pressure sensor using a Bourdon tube, there is a device previously proposed by Futsuhara and Sugimoto et. al. (Japanese Unexamined Patent Publication No. 6-288849).

With this pressure sensor, the construction is such that when pressure supplied to a movable section of a machine from a pressure source, is introduced to a pressure sensing pipe (Bourdon tube), the closed end of the pressure sensing pipe is displaced so that a member provided on the tip thereof is pressingly engaged with a free end of a cantilever spring which is excited by an oscillator. The oscillation of the cantilever spring is thus stopped, stopping an output (giving a low level condition) from an oscillating element fixed to the cantilever spring, and hence warning of a pressure (movable section of the machine movable). On the other hand, when the pressure supply to the movable section of the machine is stopped so that the pressure inside the pressure sensing pipe drops, the closed end returns to the original position, releasing the engagement with the free end of the cantilever spring. The cantilever spring thus vibrates so that an output of a high level condition is generated by the oscillating element, indicating no pressure (movable section of the machine stopped).

With this pressure sensor also, there are problems similar to those for the abovedescribed residual pressure sensor.

The present invention takes into consideration the above-mentioned situation with the object of a first aspect thereof, of providing a residual pressure sensor which does not produce an output for no residual pressure until the residual pressure has completely gone. Moreover, it is an object of a second aspect of the present invention to provide a residual pressure sensor monitoring apparatus, in a system incorporating a pressure supply control device for carrying out pressure supply to a movable section of a machine at the time of electrical power supply and for stopping pressure supply at the time of no electrical power supply, which monitors if the residual pressure sensor is normal or abnormal by monitoring the power supply condition of the pressure supply control device and the operating condition of the residual pressure sensor.

DISCLOSURE OF THE INVENTION

In view of the above, a residual pressure sensor according to a first aspect of the invention, incorporating a pressure sensing pipe with one end closed such that the closed end is displaced with an increase/decrease in pressure introduced from another end opening, and a pressure-electricity converter section which detects the displacement location of the closed end of the pressure sensing pipe and at the time of a pressure increase, decreases an electrical output in accordance with displacement of the closed end, and at the time of a pressure decrease, increases an electrical output in accordance with displacement of the closed end comprises; an electrical output change detection device for detecting whether or not the electrical output from the pressure-electricity converter section has a changing condition, and generating a low level output in the event of a changing condition, and a high level output in the event of a constant condition, and a fail-safe first logical product operating device for carrying out a logical product operation on an output from the electrical output change detection device and an output from the pressure-electricity converter section, and generating an output of logic value "1" corresponding to a high level indicating no residual pressure, when both outputs are at a high level equal to or above a predetermined value, and generating an output of logic value "0" corresponding to a low level, at the time of a fault.

In this way, while pressure remains in the pressure sensing pipe and displacement of the closed end is not stopped, an output for no residual pressure is not generated due to changes in the output from the pressure-electricity converter section, an output for no residual pressure not being generated until the residual pressure in the pipe has completely gone and the output from the pressure-electricity converter section has become constant. Moreover, since at the time of a sensor fault the output form becomes one indicating danger, with residual pressure, then the construction is fail-safe.

The pressure-electricity converter section may comprise; a plate having a slit and fixed to the pressure sensing pipe closed end so as to be displaced in accordance with displacement of the closed end, a light sensor incorporating a light emitting element and a light receiving element oppositely disposed with the plate therebetween, a first signal generator for supplying an alternating current signal to the light emitting element of the light sensor to generate an alternating current light beam, and a first rectifying circuit for clamping at a power source voltage and rectifying, an alternating current output from the light sensor, the construction being such that when a pressure in the pressure sensing pipe is equal to or less than a predetermined pressure, a light beam from the light emitting element is received by the light receiving element via the slit.

In this case, instead of supplying an alternating current signal to a light emitting element, a method such as that of Futsuhara and Sugimoto may be used with a vibrating element fitted to the plate to vibrate the plate in a direction substantially perpendicular to a direction of light emission from the light emitting element, so that the light emitted from the light emitting element is modulated to give alternating current light.

With this arrangement, it is possible to determine if the slit has dropped off.

Moreover, a reflection type light sensor may be used if the pressure-electricity converter section comprises; a plate fixed to the pressure sensing pipe closed end so as to be displaced in accordance with displacement of the closed end, a light sensor incorporating a light emitting element and light receiving element provided to one side of the plate, a first signal generator for supplying an alternating current signal to the light emitting element of the light sensor to generate an alternating current light beam, and a first rectifying circuit for clamping at a power source voltage and rectifying an alternating current output from the light sensor, and the construction is such that when a pressure in the pressure sensing pipe is equal to or less than a predetermined pressure, the light beam from the light emitting element is reflected by the plate and received by the light receiving element.

Moreover, chattering of the output due to oscillation of the closed end of the pressure sensing pipe can be prevented if there is provided; two pressure-electricity converter sections which respectively generate electrical output signals of a high level at the time of pressure levels equal to or less than mutually different first and second pressure levels, and a first self hold circuit with an output from the pressure-electricity converter section which generates an electrical output signal at pressure levels equal to or less than the first pressure level, as a trigger input signal, and an output from the pressure-electricity converter section which generates an electrical output signal at pressure levels equal to or less than the second pressure level which is higher than the first pressure level, as a reset input signal, and which self holds the trigger input signal.

The electrical output change detection device may comprise; a second signal generating device for superimposing a high frequency alternating current signal on an output from the pressure-electricity converter section, an amplifying device into which is input by way of a coupling capacitor, the output from the pressure-electricity converter section on which is superimposed the high frequency alternating current signal of the second signal generating device, and wherein the amplified output is saturated when the output from the pressure-electricity converter section is in a changing condition, and a second rectifying circuit for clamping the alternating current amplified output from the amplifying device at the power source voltage and rectifying, the construction being such that the rectified output from the second rectifying circuit is output to the first logical product operating device.

Moreover, the first logical product operating device may be constructed of a fail-safe window comparator having two input terminals, which generates an alternating current output higher than the power source voltage when each of the input signals input to the respective input terminals are equal to or above a previously set lower limit threshold value, and which generates an output of logic value "0" at the time of a fault.

Furthermore with a residual pressure sensor monitoring apparatus according to a second aspect of the present invention, applicable to a system incorporating a pressure supply control device for carrying out pressure supply to a movable section of a machine at the time of electrical power supply and for stopping pressure supply at the time of no electrical power supply, which monitors that there is no pressure supply to the movable section of the machine using a residual pressure sensor incorporating, a pressure sensing pipe with one end closed such that the closed end is displaced with an increase/decrease in pressure introduced from another end opening, and a pressure-electricity converter section which detects the displacement location of the closed end of the pressure sensing pipe and at the time of a pressure increase, decreases an electrical output in accordance with displacement of the closed end, and at the time of a pressure decrease, increases an electrical output in accordance with displacement of the closed end, the residual pressure sensor monitoring apparatus being for monitoring if the operation condition of the residual pressure sensor is normal or abnormal, the residual pressure sensor monitoring apparatus may include; a current sensor which monitors the electrical power supply condition of the pressure supply control device, and generates a low level output of logic value "0" at the time of electrical power supply, and generates a high level output of logic value "1" at the time of no electrical power supply, and generates an output of logic value "0" at the time of a fault, a fail-safe NOT operating device which carries out a NOT operation on the logical output from the residual pressure sensor, which generates a low level output of logic value "0" at the time of supply pressure to the movable section of the machine, and a high level output of logic value "1" at the time of no supply pressure, and generates an output of logic value "0" at the time of a fault, and which generates a low level output of logic value "0" at the time of a fault, and a judgement device which judges if there is a residual pressure sensor fault based on respective logical outputs from the current sensor and the NOT operating device, and when both logical outputs are logic value "0", generates a low level output of logic value "0" indicating a fault in the residual pressure sensor.

With such a construction, when an output of logic value "1" is generated, indicating that the residual pressure sensor has no residual pressure even though the pressure supply control device is switched on so that pressure is supplied to the movable section of the machine, the output from the judgement device becomes a logic value "0". Consequently, at the point when pressure supply is commenced, it can be known that a blockage has occurred in the residual pressure sensor.

Moreover, the construction may be such that there is provided a second logical product operating device for carrying out a logical product operation on the output from the judgement device and the output from the current sensor, and a third logical product operating device for carrying out a logical product operation on the output from the second logical product operating device and the output from the residual pressure sensor, and the output from the third logical product operating device is made the residual pressure sensor fault judgement output. Then when during pressure supply, a blockage occurs in the pressure inlet of the residual pressure sensor, the output from the third logical product operating device becomes a low level of logic value "0", so that the residual pressure sensor fault can be known.

Moreover, the construction may be such that the judgement device is an adding circuit, and there is provided a fail-safe first window comparator with upper and lower threshold values set on either side of an intermediate value of an addition output from the adding circuit, which generates a high level output of logic value "1" when an addition output within the threshold value range is input, and which generates an output of logic value "0" at the time of a fault, an off-delay device which time delays a drop in the output from the first window comparator to longer than a period from when the current sensor generates an output indicating no current until the residual pressure sensor generates an output indicating no residual pressure, and a second window comparator which generates an output of logic value "0" indicating a residual pressure sensor fault when the output from the off-delay device is lower than a predetermined level. Then if the residual pressure sensor has a fault so that the output becomes a logic value "0", the output from the second window comparator becomes a low level of logic value "0" after an elapse of the delay time of the off-delay device, so that the residual pressure sensor fault can be known.

Moreover, the construction may be such that a counter is provided which counts a clock signal at the time of inputting an output from the current sensor of a logic value of "1" indicating no current, and stops counting at the time of inputting an output from the residual pressure sensor of logic value "1" indicating no pressure. It can then be known that when the counter value is excessively long, the period from stopping the pressure supply until indication of no residual pressure has become excessive due to deterioration of the pressure sensing pipe causing the return operation following the pressure stoppage to slow down.

Moreover, the construction may be such that the residual pressure sensor comprises; an electrical output change detection device for detecting whether or not the electrical output from the pressure-electricity converter section has a changing condition, and generating a low level output in the event of a changing condition, and a high level output in the event of a constant condition, and a fail-safe first logical product operating device for carrying out a logical product operation on an output from the electrical output change detection device and an output from the pressure-electricity converter section, and generating an output of logic value "1" corresponding to a high level indicating no residual pressure, when both outputs are at a high level equal to or above a predetermined value, and generating an output of logic value "0" corresponding to a low level, at the time of a fault.

Due to the above constructions, the residual pressure sensor does not generate a high level output of logic value "1" indicating no residual pressure until the residual pressure has completely gone. Therefore in a system which is dangerous when the residual pressure has not completely gone even after stoppage of the pressure supply to the movable section of the machine, the safety of the operator can be more reliably ensured.

BRIEF DESCRIPTION OF THE DRAWINGS

FIG. 4(A) is an example of an amplifying circuit used in the first embodiment, while FIG. 4(B) is another example of an amplifying circuit;

BEST MODE FOR CARRYING OUT THE INVENTION

As follows is a description of embodiments of the present invention with reference to the drawings.

Figure 1:
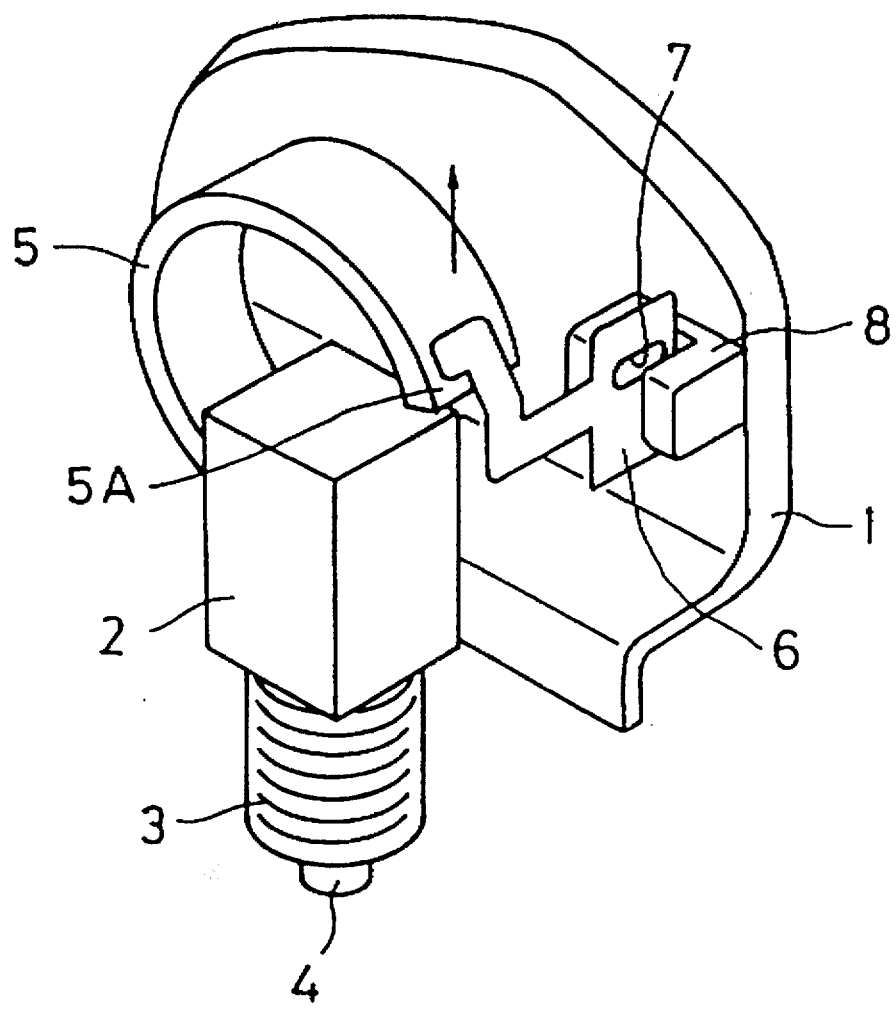
FIG. 1 is a perspective view showing the construction of a first embodiment of a residual pressure sensor according to a first aspect of the present invention.

FIG. 1 is a structural diagram of a first embodiment of a residual pressure sensor according to a first aspect of the present invention.

In FIG. 1, a base 1 has a pressure inlet pipe 2 in the form of a hollow square block, secured to a lower portion thereof. The pressure inlet pipe 2 is for connecting to and taking pressure from for example a supply pipe (not shown) for supplying pressure from a pressure source to a movable section of a machine. One end of the pressure inlet pipe 2 is closed, while the other end is provided with a hollow cylindrical threaded portion 3 for connecting to the supply pipe, with a pressure inlet 4 for taking the pressure when connected. A pressure sensing pipe 5 bent into an approximate C-shape, has a base end communicatively connected and secured to the pressure inlet pipe 2, and a tip end formed as a closed end 5A. The construction is such that when pressure is introduced via the pressure inlet pipe 2, the closed end 5A is displaced in the direction of the arrow in FIG. 1 (upwards direction) with increase in pressure.

A plate 6 having a slit 7, is attached to the tip of the closed end 5A of the pressure sensing pipe 5, in approximate parallel with the direction of displacement of the closed end 5A. Moreover, a photocoupler 8 serving as a light sensor, having a light emitting element 8a and a light receiving element 8b opposed to each other with the plate 6 therebetween, is secured to the base 1.

Figure 2:
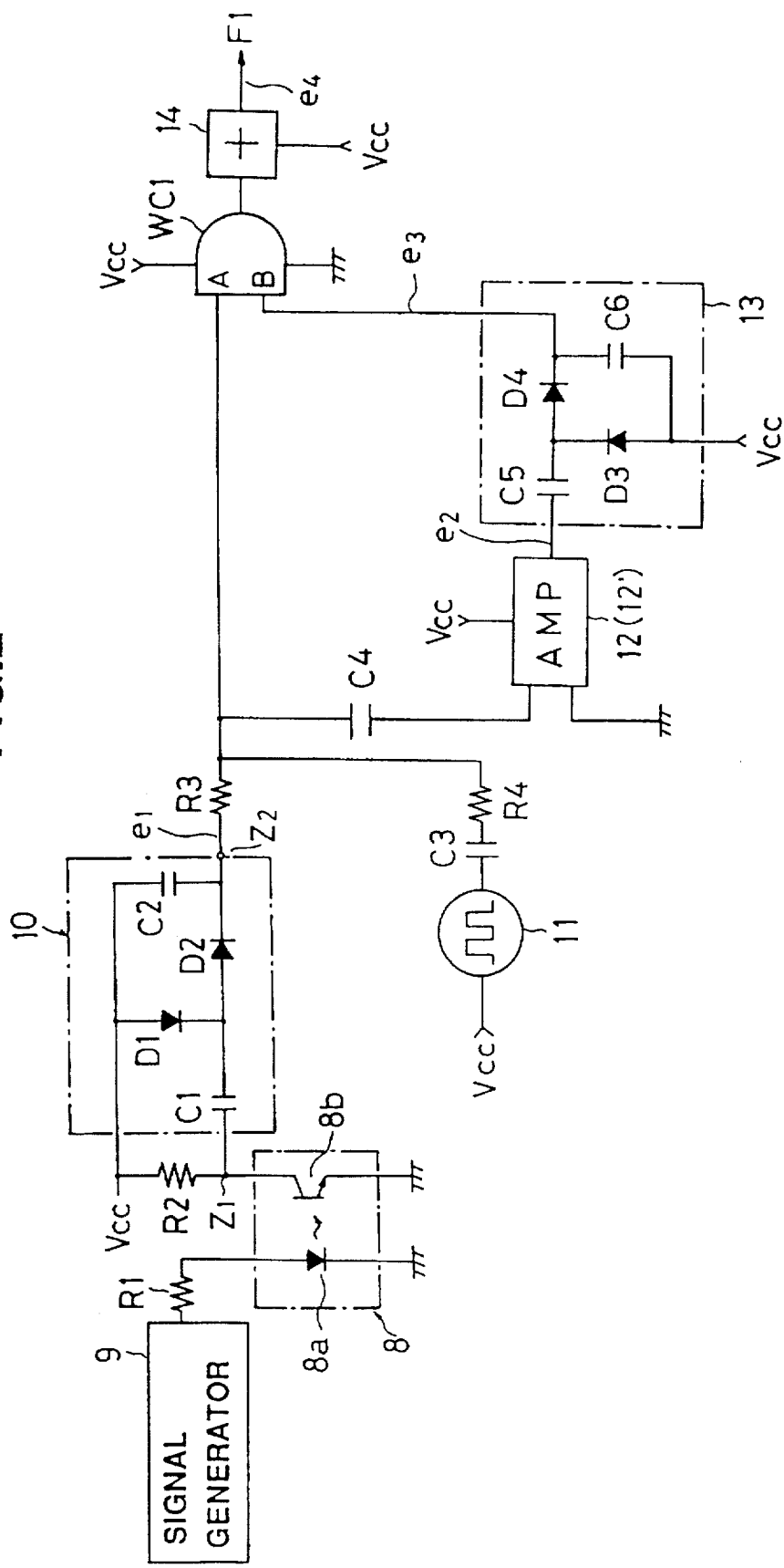
FIG. 2 is an electrical circuit diagram of the first embodiment.

As shown in FIG. 2, the light emitting element 8a of the photocoupler 8, is activated by an alternating current signal supplied from a first signal generator 9 via a current reducing resistor R1, to produce an alternating current light beam. The light receiving element 8b, has a power source voltage Vcc input for example via a resistor R2 to the collector, and generates an electrical output signal from a point Z1 in FIG. 2, in proportion to the amount of light received. The signal received by the light receiving element 8b is rectified by a voltage doubler rectifying circuit 10 serving as a first rectifying circuit, comprising capacitors C1, C2 and diodes D1, D2. Here the plate 6, the photocoupler 8, the first signal generator 9 and the voltage doubler rectifying circuit 10 constitute a pressure-electricity converter section.

An output terminal Z2 of the voltage doubler rectifying circuit 10 is connected via a resistor R3 to one input terminal A of a fail-safe two input window comparator WC1. The window comparator WC1 corresponds to a first logical product operating device.

The fail-safe two input window comparator WC1 is disclosed for example in U.S. Pat. No. 4,661,880, and in papers such as that of M. Kato, M. Sakai, K. Futsuhara, etc. entitled "LSI Implementation and Safety Verification of Window Comparation Used in Fail-Safe Multiple-Valued Logic Operation" (IEICE TRANS. ELECTRON., VOL. E76-C, NO. 3, MARCH 1993).

Figure 3:
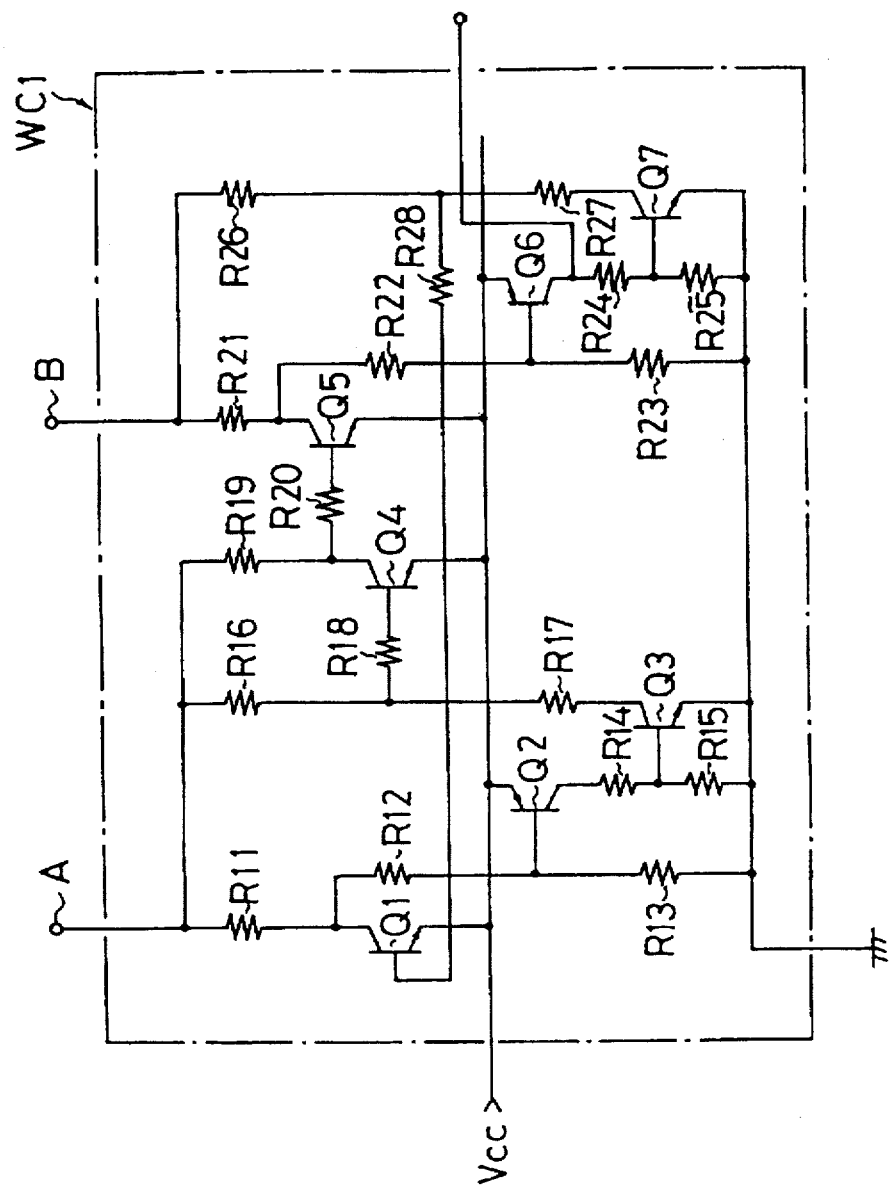
FIG. 3 is a circuit diagram of a window comparator used in the first embodiment.

The two input window comparator WC1 as shown for example in FIG. 3, comprises resistors R11~R28 and transistors Q1~Q7. Input terminals A, B have threshold values with respective upper and lower limits. When a signal having an input level within the respective threshold value ranges is input to each of the input terminals A, B, oscillation at a high frequency occurs to produce an alternating current output signal.

That is to say, the construction is such that with respective input voltages of the input terminals A, B as V1, V2 and the power source voltage as Vcc, oscillation only occurs when the respective input signals satisfy the following conditions;

$$\frac{(R11 + R12 + R13) Vcc}{R13} < V1 < \frac{(R16 + R17) Vcc}{R17} \quad (1)$$

$$\frac{(R21 + R22 + R23) Vcc}{R23} < V1 < \frac{(R26 + R27) Vcc}{R27} \quad (2)$$

A second signal generator 11 is for generating an alternating current signal. This alternating current signal is superimposed on an output signal $e_1$ from the voltage doubler rectifying circuit 10, by way of a capacitor C3 and a resistor R4. The first signal generator 9 may be used for the second signal generator 11.

An amplifier 12 amplifies the output signal $e_1$ from the voltage doubler rectifying circuit 10 which has been superimposed with the alternating current signal, and which is input by way of a coupling capacitor C4. The amplifier 12 and the capacitor C4 together constitute a wideband amplifying circuit. It also amplifies the slow fluctuations occurring in the output signal $e_1$ from the voltage doubler rectifying circuit 10 accompanying the output frequency ω of the second signal generator 11, and the pressure changes (displacement of the pressure sensing pipe 5).

Figure 4:
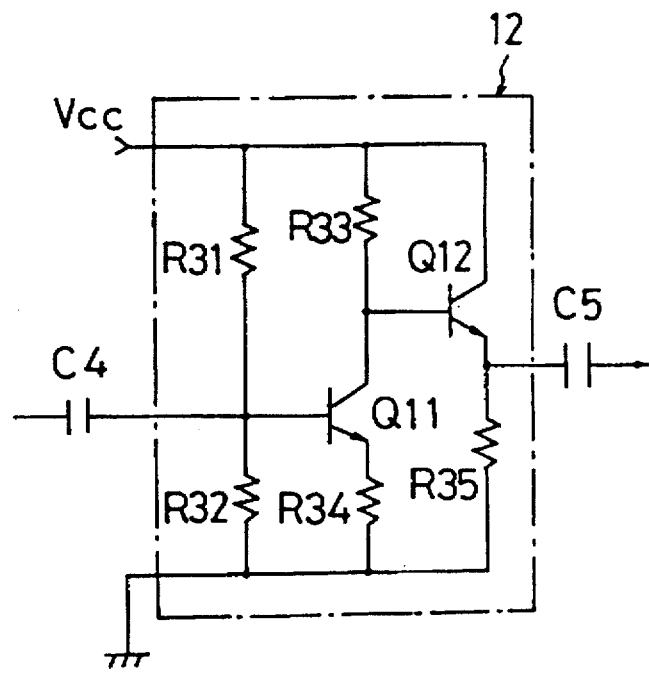
Figure 4:
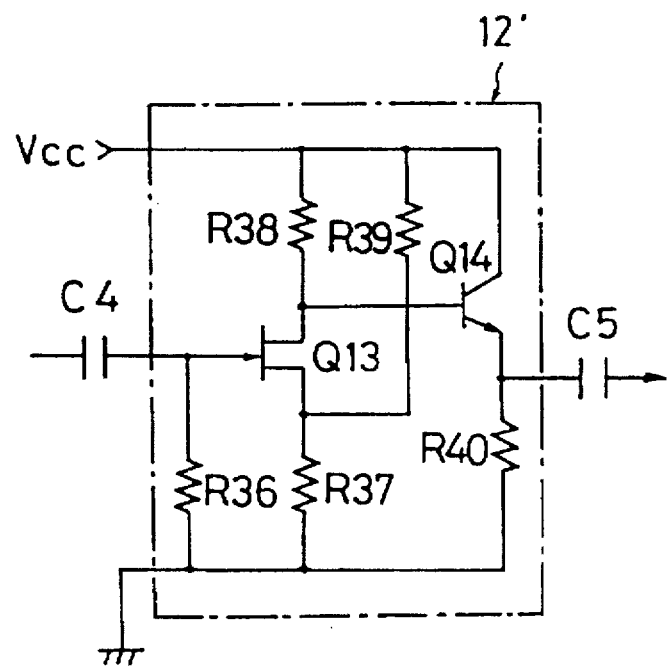

The amplifier 12 as shown for example in FIG. 4(A), is a known amplifier comprising an emitter ground amplifying circuit and an emitter follower amplifying circuit, having resistors R31~R35 and capacitors Q11, 012. An amplifier 12' as shown in FIG. 4(B), comprising a FET amplifying circuit and an emitter follower amplifying circuit, having resistors R36~R40, a field effect transistor (FET) Q13 and a transistor Q14, may also be used.

A voltage doubler rectifying circuit 13 serving as a second rectifying circuit, comprises two capacitors C5, C6 and two diodes D3, D4. An output signal $e_2$ from the amplifier 12 is clamped at the power source voltage Vcc. The capacitors C5, C6 are set so as to rectify the alternating current signal of output frequency ω from the second signal generator 11, and generate a direct current output signal $e_3$, with the slow fluctuation signal (output signal $e_1$ from the voltage doubler rectifying circuit 10) accompanying the pressure changes being blocked by the coupling capacitor C5. Consequently, the voltage doubler rectifying circuit 13 has a rectifying function, and a filter function which passes high frequency signals. The output signal $e_3$ from the voltage doubler rectifying circuit 13 is input to the other input terminal B of the window comparator WC1. Here the second signal generator 11, the amplifier 12 and the voltage doubler rectifying circuit 13 constitute the electrical output change detection device.

A voltage doubler rectifying circuit 14 has a similar construction to the voltage doubler rectifying circuit 10. It clamps the oscillating output signal from the window comparator WC1 at the power source voltage Vcc, to generate an output signal $e_4$.

Here, with the upper limit threshold value of the input terminal A of the window comparator WC1 as Th1AH, and the lower limit threshold value as Th1AL, and the upper limit threshold value of the input terminal B as Th1BH, and the lower limit threshold value as Th1BL, the window comparator WC1 carries out the following threshold value operation, depending on the input levels of the respective input signals $e_1$ and $e_3$.

$$F = F_A \cdot F_B \quad (3)$$

where
$F_A = 1 \ (Th1AH \geq e_1 \geq Th1AL)$
$\phantom{F_A} = 0 \ (Th1AH < e_1, \text{ or } Th1AL > e_1)$
and
$F_B = 1 \ (Th1BH \geq e_3 \geq Th1BL)$
$\phantom{F_B} = 0 \ (Th1BH < e_3, \text{ or } Th1BL > e_3)$ Here F is the logical product output from the window comparator WC1. $F_A$ is the logical input signal input to the input terminal A, and $F_B$ is the logical input signal input to the input terminal B. Symbol "·" indicates the logical product.

Accordingly, with the voltage doubler rectifying circuit 14, when the logical binary output is F1 so that the window comparator WC1 oscillates (when F=1), the output signal $e_4$ is generated as a logic value "1" output (F1=1) of a higher level than the power source voltage Vcc, while when the window comparator WC1 does not oscillate (when F=0), resulting in a low level (power source voltage Vcc), the output signal $e_4$ is generated as logic value "0" output (F1=0).

Figure 5:
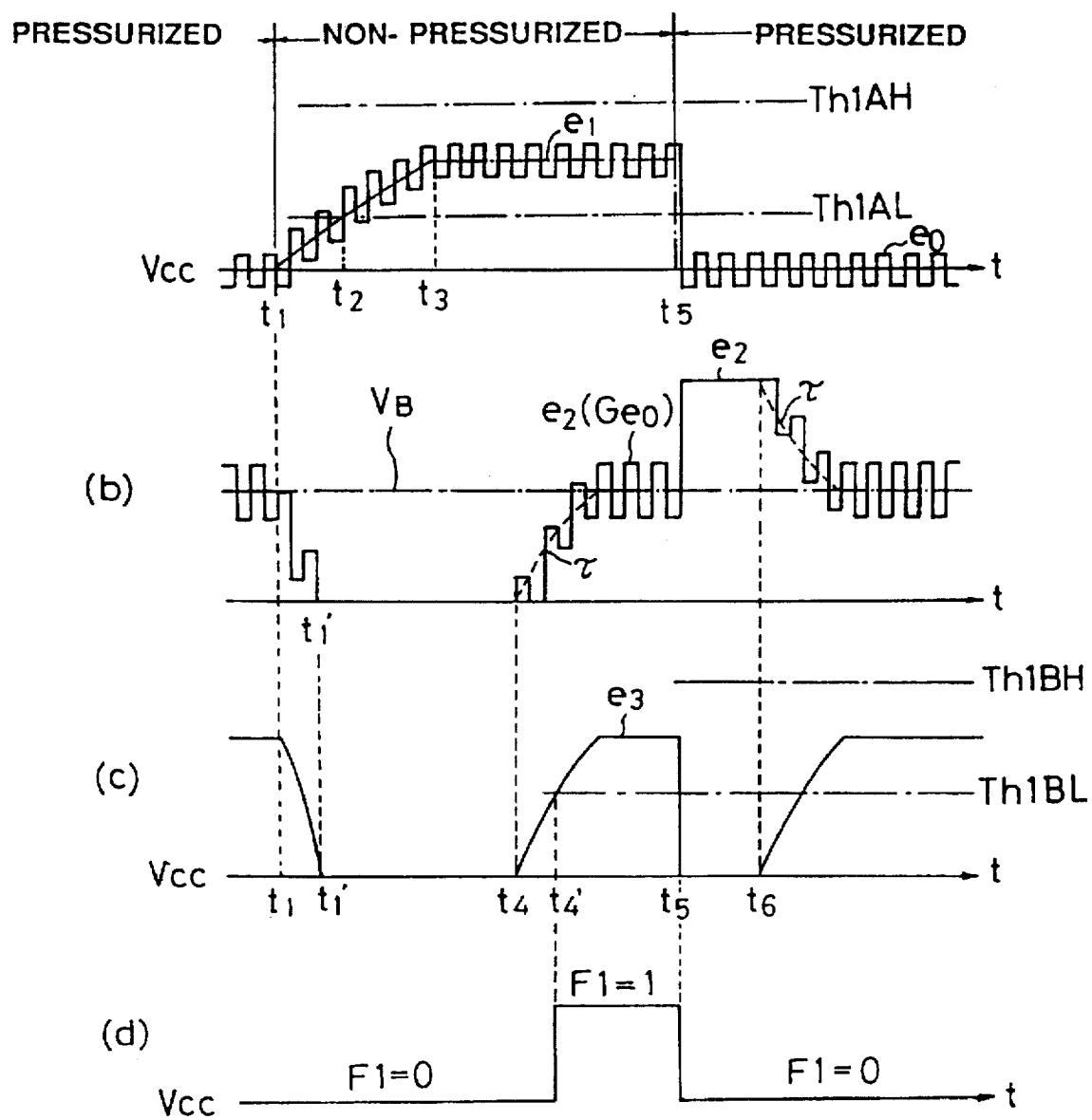
FIG. 5 is a time chart for explaining an operation of the first embodiment.

The operation of the circuit of the first embodiment will now be described with reference to the time chart of FIG. 5.

In the pressurized condition with pressure supplied to the movable section of the machine, the light beam from the light emitting element 8a to the light receiving element 8b is cut off by the plate 6 due to displacement of the pressure sensing pipe 5, so that the output from the photocoupler 8 disappears, and the level of the output signal $e_1$ from the voltage doubler rectifying circuit 10 becomes a low level (power source voltage Vcc). When in this condition, the pressure supply to the movable section of the machine is stopped, a non-pressurized condition results with the pressure sensing pipe 5 being gradually displaced to its original position with the drop in pressure therein. During the course of this displacement, the light beam amount received by the light receiving element 8b by way of the slit 7 gradually increases with movement of the plate 6, so that the level of the output signal $e_1$ from the voltage doubler rectifying circuit 10 also slowly increases accordingly, becoming a constant value at the point when the pressure inside the pressure sensing pipe 5 is completely gone. The output signal of the second signal generator 11 is voltage divided by the resistor R3 and the resistor R4 and superimposed on this output signal $e_1$ from the voltage doubler rectifying circuit 10, and input to the amplifier 12 by way of the capacitor C4. With this superimposed signal as $e_0$, the condition of the input signal to the amplifier 12 is shown in FIG. 5(a). In FIG. 5, $t_1$ is the time when the light beam first passes through the slit 7, while $t_3$ is the time when the pressure inside the pressure sensing pipe 5 is completely gone.

With the amplifier 12, when the direct current component of the input signal (voltage doubler rectifying circuit output signal $e_1$) is constant relative to an operating point $V_B$, the alternating current component signal $e_0$ is amplified and output (the amplified output at this time is shown as $Ge_0$, where G is the gain). Moreover, when the direct current component of the input signal is changing, this is amplified and reaches the saturation level, and the alternating current amplified signal $Ge_0$ disappears.

Accordingly, while the output from the amplifier 12 is saturated, accompanying the changes in the output signal $e_1$ from the voltage doubler rectifying circuit 10 (from time t1' to time t4), then as shown in FIG. 5(b), the alternating current signal component of the signal generator 11 in the output from the amplifier 12 disappears. Moreover, even after the output signal $e_1$ from the voltage doubler rectifying circuit 10 has become constant, the alternating current signal component $Ge_0$ does not appear during the time determined by a time constant τ of the coupling capacitor C4 and the input resistance of the amplifier 12, but appears from the point when this time has elapsed. Also at the time of change from the non-pressurized condition to the pressurzed condition, the alternating current signal component of the signal generator 11 similarly disappears during the time t5~t6.

With the voltage doubler rectifying circuit 13, the electrostatic capacity of the capacitors C5, C6 is set so as to rectify the alternating current signal of frequency ω from the second signal generator 11. Therefore, in the amplified output periods (t1'~t4 and t5~t6) as shown in FIG. 5(c), wherein there is no alternating current signal component $Ge_0$, the output signal $e_3$ from the voltage doubler rectifying circuit 13 becomes a low level (power source voltage Vcc).

Accordingly, while changing from the pressurized condition to the non-pressurized condition, then during reduction of the pressure inside the pressure sensing pipe 5 (time $t_2$ in FIG. 5(a)), the output level of the voltage doubler rectifying circuit 10 becomes equal to above the lower limit threshold value Th1AL of the input terminal A of the window comparator WC1. However, at this time, the output signal $e_3$ from the voltage doubler rectifying circuit 13 is at a lower level than the lower limit threshold value Th1BL of the input terminal B of the window comparator WC1, so that an output signal is not produced from the window comparator WC1. After this, and a little after the residual pressure inside the pressure sensing pipe 5 becomes completely zero (output signal $e_1$ constant), shown as time t4' in FIG. 5(c), the output from the voltage doubler rectifying circuit 13 becomes equal to or above the lower limit threshold value Th1BL of the input terminal B, so that an oscillating output from the window comparator WC1 is generated, causing the output signal $e_4$ from the voltage doubler rectifying circuit 14 to become a high level (F1=1), and this point there is an output indicating no residual pressure. That is to say, the high level output signal F1=1 always has a time delay δ from after the residual pressure becomes zero.

Moreover, at the time of changing from the non-pressurized condition to the pressurized condition (time $t_5$ in FIG. 5), the level of the output signal $e_1$ from the voltage doubler rectifying circuit 10 immediately becomes less than the lower limit threshold value Th1AL of the input terminal A of the window comparator WC1. Therefore the output signal $e_4$ from the voltage doubler rectifying circuit 14 becomes a low level (F1=0), with the output indicating a pressure.

With the circuit construction of the embodiment as described above, the signal of F1=1 indicating zero residual pressure is not generated from the voltage doubler rectifying circuit 14 until the displacement of the closed end 5A of the pressure sensing pipe 5 has completely stopped; that is to say the residual pressure is completely at zero. Therefore, from the point of ensuring operator safety, the arrangement is far superior to the conventional arrangement wherein the output for no residual pressure is generated prior to the pressure being completely gone.

Moreover, with the circuit of FIG. 2, the voltage doubler rectifying circuits 10, 13, and 14 are constructed such that at the time of a fault, a high level output signal (indicating safety) is never produced. Furthermore, the wide band amplifier constituted by the capacitor C4 and the amplifier 12 is also a circuit which does not generate an alternating current output signal at the time of a fault. For example, if a short circuit fault occurs in the capacitor C4, a power source voltage Vcc is directly applied to the input side of the amplifier 12 by way of the diodes D1, D2 of the voltage doubler rectifying circuit 10 and the resistor R3, so that the signal $e_0$ cannot be amplified and output. Moreover, if a fault occurs in the window comparator WC1, an oscillating output signal is not produced. Accordingly, the circuit of the present embodiment is a fail-safe circuit which does not produce an output signal of logic value "1" indicating no residual pressure (safety) at the time of a fault.

The upper limit threshold value of the window comparator WC1 is not always necessary. Accordingly, the upper limit threshold value may be set to a sufficiently high level.

In the case wherein a transmission type light sensor is used in the abovedescribed form wherein at the time of no pressure, light is received by the light receiving element 8b via the slit 7 to thus detect no pressure, then if the plate 6 drops off from the pressure sensing pipe closed end 5A, the emitted light from the light emitting element 8a is always received by the light receiving element 8b, resulting in a dangerous situation with safety being indicated.

Figure 6:
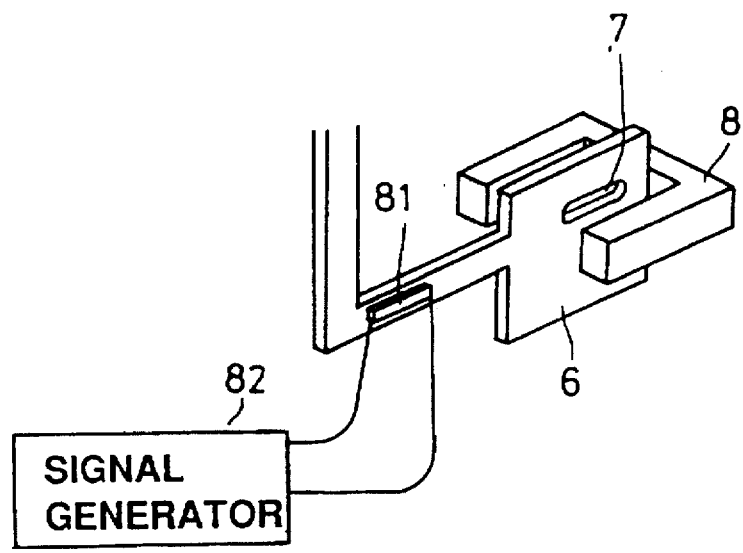
FIG. 6 is a structural diagram of the main components of a second embodiment of a residual pressure sensor.

Therefore, when a transmission type light sensor is used, the light source can be a direct current light, with a construction according to a second embodiment shown in FIG. 6, wherein an oscillator 81 is fitted to the plate 6. The oscillator 81 is driven by a signal generator 82 so as to continually excite the plate 6 at a higher frequency than the light beam of the light emitting element 8a, and in a direction substantially perpendicular to the light emission direction of the light emitting element 8a, thereby modulating the light beam from the light emitting element 8a. In this case, the time constant of the rectifying circuit 10 is set to conform to the oscillation frequency of the oscillator 81.

With such a construction, only when a light beam modulated by the oscillations of the plate 6 is received by the light receiving element 8b is the charging/discharging of the capacitors C1, C2 of the rectifying circuit 10 carried out and a high level electrical output signal produced at the output terminal Z2 of the rectifying circuit 10. If the plate 6 drops off so that modulation ceases, then even though the light from the light emitting element 8a is transmitted to the light receiving element 8b, a high voltage above the power source voltage Vcc is not produced at the output terminal Z2 of the rectifying circuit 10, so that an erroneous high level output indicating no pressure in spite of there being a pressure, is not produced.

Figure 7:
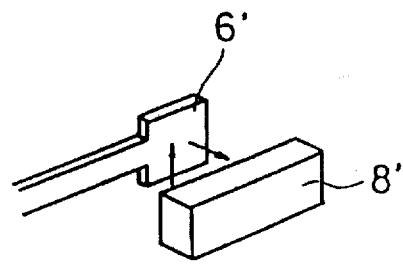
FIG. 7 is a structural diagram of the main components of a third embodiment of a residual pressure sensor.

The above embodiments both illustrate a transmission type light sensor. However it is also possible to use a reflection type light sensor according to a third embodiment as shown in FIG. 7, wherein a plate 6' having no slit is fixed to the closed end 5A of the pressure sensing pipe 5, and a photocoupler 8' is arranged with a light emitting element and light receiving element provided to one side of the plate 6'.

With such a construction, when there is a pressure (movable condition for the movable section of the machine), the plate 6' is raised with displacement of the closed end 5A, so that the light from the light emitting element is not reflected by the plate 6', and is thus not transmitted to the light receiving element, resulting in a low level output form indicating danger. On the other hand, when there is no pressure (stop condition for the movable section of the machine), displacement of the pressure sensing pipe 5 ceases so that the light from the light emitting element is reflected by the plate 6', and transmitted to the light receiving element. As a result, a high level electrical output signal indicating safety is generated from the rectifying circuit 10.

A fourth embodiment of a residual pressure sensor will now be described with reference to FIGS. 8 to 10. Parts similar to those of the abovementioned embodiments are indicated by the same symbols, and description is omitted.

Figure 8:
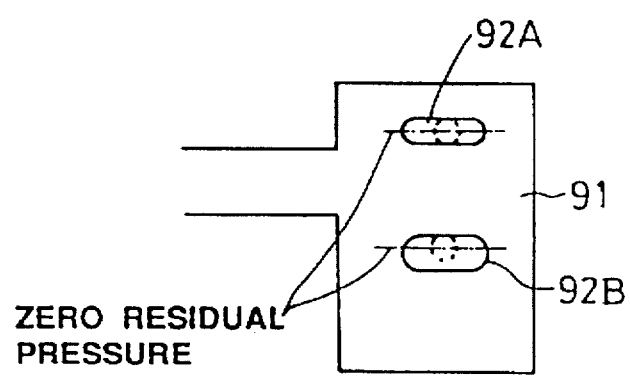
FIG. 8 is a structural diagram of the main components of a fourth embodiment of a residual pressure sensor.

With this embodiment as shown in FIG. 8, two slits 92A, 92B are provided in a plate 91 fixed to the closed end 5A of the pressure sensing pipe 5, and two photocouplers 8A, 8B of the same construction as the photocoupler 8 in FIG. 2, are provided opposite to the respective slits 92A, 92B. The slit 92B has a wider slit width than that of the slit 92A, such that the positional relationship becomes as shown in FIG. 8 when the residual pressure is zero, as shown by the chain line in FIG. 8 (the position wherein the light beam is received by the light receiving element. This is different from the position wherein the residual pressure is completely zero). The construction is thus such that, with the introduction of pressure, and displacement of the closed end 5A of the pressure sensing pipe 5, the light of the photocoupler 8A opposite to the slit 92A is first cut off by the plate 91, after which the light of the photocoupler 8B opposite to the slit 92B is cut off.

Figure 9:
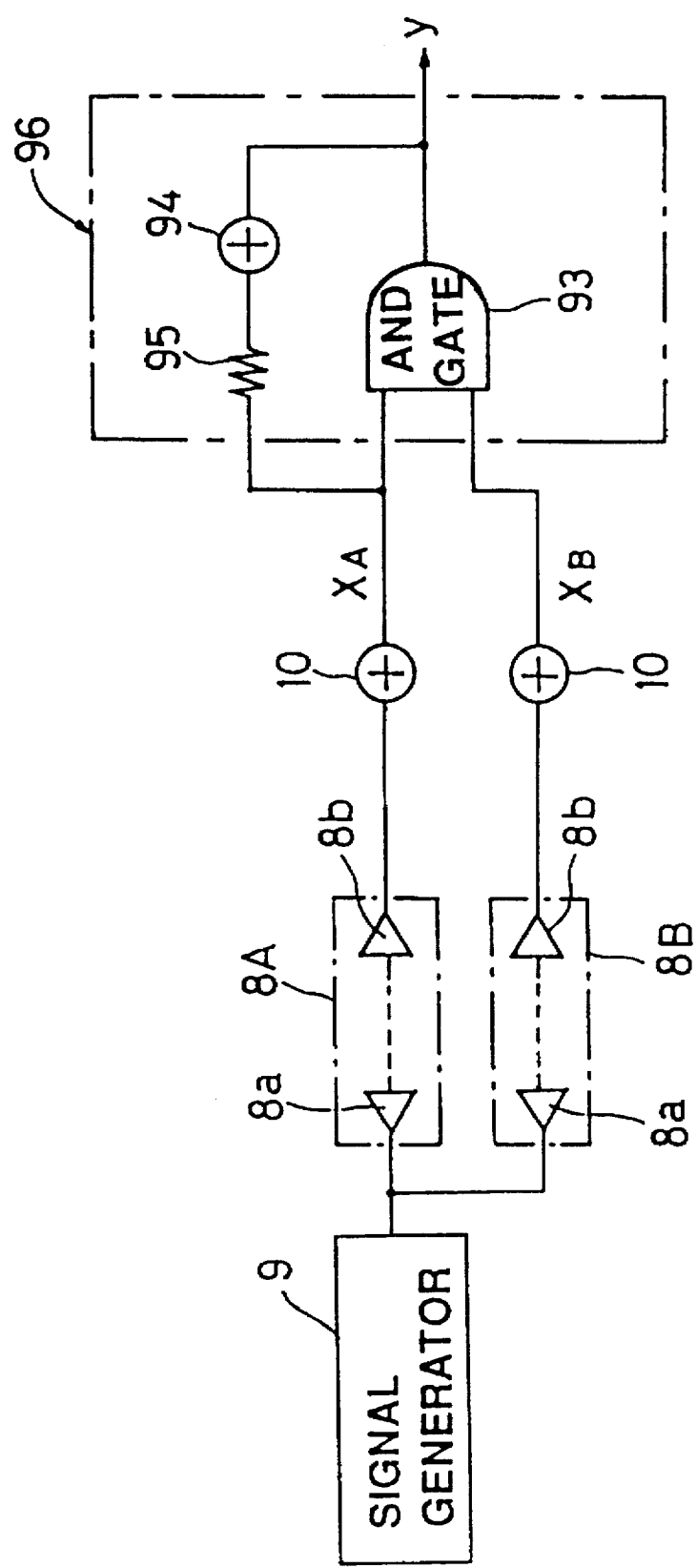
FIG. 9 is an electrical circuit diagram of a pressure-electricity converter section of the fourth embodiment.

Moreover, as shown in FIG. 9, outputs $X_A$, $X_B$ of the respective photocouplers 8A, 8B, which have been rectified by the rectifying circuit 10, are input to a first self hold circuit 96 comprising, a well known fail-safe AND gate 93 which does not generate an output at the time of a fault, a rectifying circuit 94, and a resistor 95. The self hold circuit 96 is constructed with the output from the photocoupler 8A as a trigger input, the output from the photocoupler 8B as a reset input, and with the trigger input self held by an output y.

Figure 10:
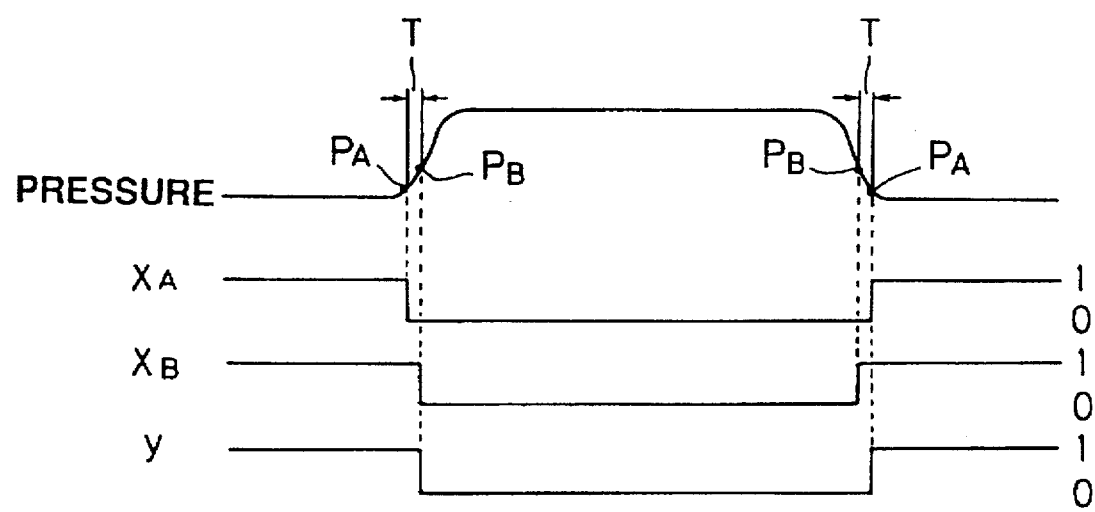
FIG. 10 is a time chart illustrating a relation between residual pressure and an output from the pressure-electricity converter section of the fourth embodiment.

Next is a description of the operation of the circuit with reference to the time chart of FIG. 10.

When the residual pressure is zero, the light receiving elements 8b of the photocouplers 8A, 8B receive light via the slits 92A, 92B, so that both inputs to the AND gate 93 of the self hold circuit 96 are a high level, and the output signal y of the self hold circuit 96 becomes a high level output of logic value "1" indicating safety.

When pressure is supplied from this condition, the closed end 5A of the pressure sensing pipe 5 is displaced with an increase in pressure, so that the plate 91 is also displaced in an upward direction in FIG. 8. Then, when the pressure becomes higher than the level shown at $P_A$ in FIG. 10, at first the slit 92A moves outside of the light path of the light emitting element 8a of the photocoupler 8A so that the light beam is shut off. The rectified output $X_A$ from the photocoupler 8A thus ceases, so that the trigger input to the self hold circuit 96 stops. However, since the trigger input is self held by the rectified output from the rectifying circuit 94, of the output y of the self hold circuit 96, then the output signal y of the self hold circuit 96 is held at a logic value "1". When after this the pressure rises further to become higher than $P_B$, the light from the photocoupler 8B of the slit 92B is also shut off, so that the rectified output $X_B$ stops. As a result, the output signal of the self hold circuit 96 becomes a low level of logic value "0", warning that the movable section of the machine is in a movable condition.

After this, when the pressure supply to the movable section of the machine is stopped, the plate 91 moves in the opposite direction due to the pressure stoppage, and when the residual pressure falls below $P_B$, light is received by the light receiving element 8b of the photocoupler 8B by way of the slit 92B, and the rectified output $X_B$ of the photocoupler 8B is input to the AND gate 93 of the self hold circuit 96. At this time, since the rectified output $X_A$ of the photocoupler 8A is not yet input, then the output signal y of the self hold circuit 96 remains at logic value "0".

The pressure then falls further and when the residual pressure falls below $P_A$, light is received by the light receiving element 8b of the photocoupler 8A by way of the slit 92A, and the rectified output $X_A$ of the photocoupler 8A is also input to the AND gate 93 of the self hold circuit 96. As a result, the self hold circuit 96 is triggered and the output signal y of the self hold circuit 96 becomes a high level of logic value "1".

Hence, with the fourth embodiment at the time of a pressure rise, when the pressure becomes higher than $P_B$, the output signal y of the self hold circuit 96 becomes a logic value "0", while at the time of a drop in the residual pressure, when the pressure falls below $P_A$, the output signal y of the self hold circuit 96 becomes a logic value "1". Consequently, a hysteresis width T as shown in FIG. 10 is obtained, enabling prevention of a chattering phenomena wherein the output signal y of the self hold circuit 96 is switched ON and OFF due to oscillation of the plate 91 with fluctuations in pressure.

As follows is a description of a residual pressure sensor monitoring apparatus according to a second aspect of the present invention.

Figure 11:
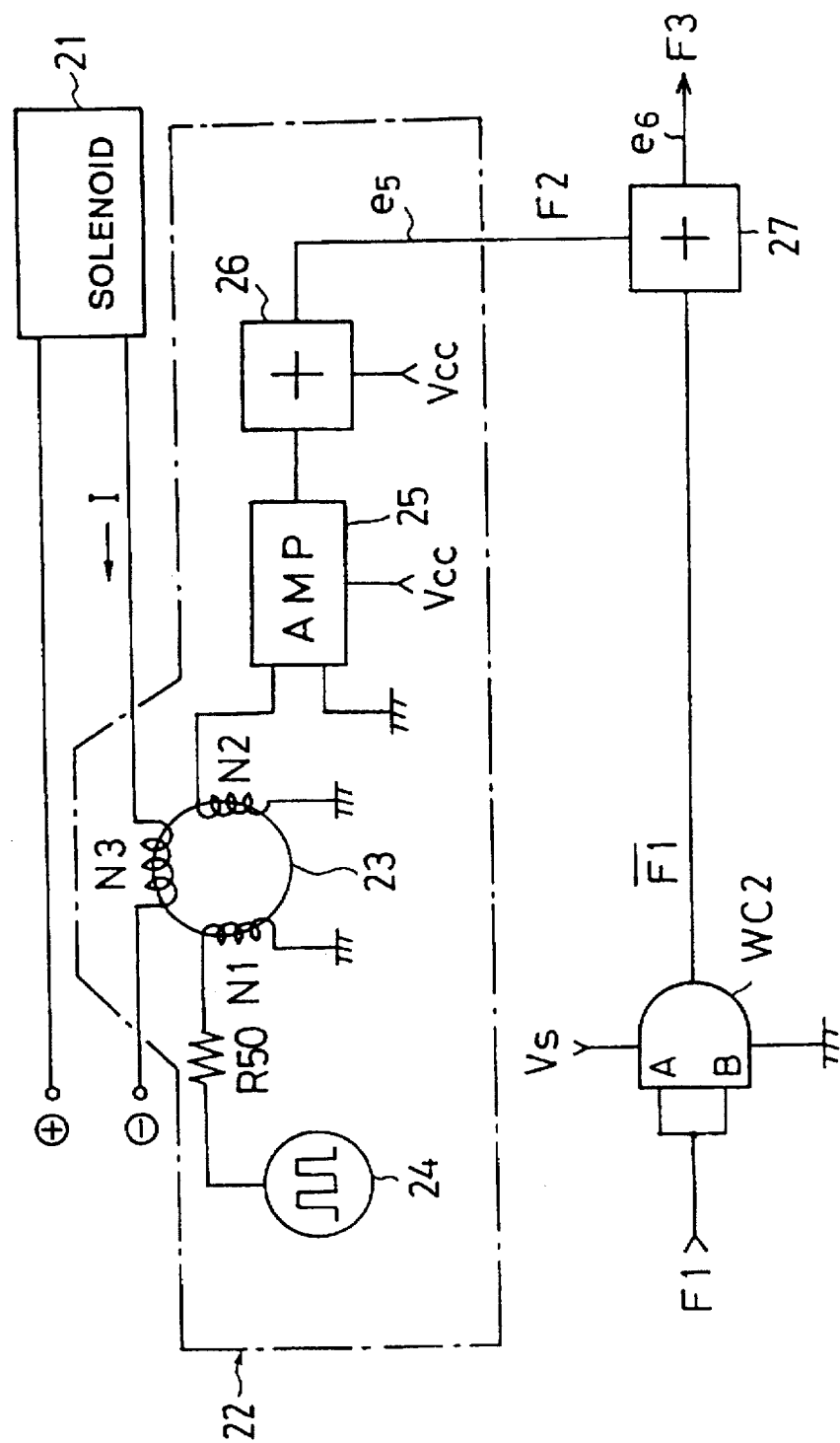
FIG. 11 is a circuit diagram illustrating a first embodiment of a residual pressure sensor monitoring apparatus according to a second aspect of the present invention.

FIG. 11 shows a first embodiment of the residual pressure sensor monitoring apparatus according to the second aspect, in the form of a circuit applied to a system wherein pressure supply to a movable section of a machine is carried out with a solenoid valve.

In FIG. 11, a solenoid 21 is for driving a solenoid valve (not shown), disposed for example in a pressure supply pipe. The solenoid valve, serving as a pressure supply control device, is switched on (opened) with supply of a current I, to thus open a pressure supply pipe connected to a movable section of a machine to supply pressure thereto. A current sensor 22 monitors the current I flowing in the solenoid 21, and is constructed such that an output signal $e_5$ therefrom becomes a low level when the current I flows in the solenoid 21, and becomes a high level when there is no current I.

The current sensor 22 comprises; a saturable magnetic ring core 23 wound with three windings, namely first to third windings N1~N3, a signal generator 24 for supplying a high frequency signal to the first winding N1, an AC amplifier 25, for example of the same construction as the amplifier 12 of FIG. 2, connected to the second winding N2 for amplifying a signal therefrom, and a voltage doubler rectifying circuit 26 serving as a third rectifying circuit, for rectifying an output from the AC amplifier 25. The third winding N3 is connected in series to a power lead of the solenoid 21.

With this current sensor 22, when the solenoid drive current I does not flow in the third winding N3, the high frequency signal supplied to the first winding N1 from the signal generator 24 by way of a resistor R50 is transmitted to the second winding N2 by way of the ring core 23, and the received signal output then amplified by the AC amplifier 25. On the other hand, when the current I flows in the third winding N3, the ring core 23 becomes saturated. As a result, transmission of the signal from the first winding N1 to the second winding N2 is impaired, and the amplified output from the AC amplifier 25 drops considerably. Consequently, the output signal $e_5$ clamped at the power source voltage Vcc by the voltage doubler rectifying circuit 26 and rectified, with a logical output thereof as F2, becomes a logic value "1" (F2=1) of a high level (higher than power source voltage Vcc) when there is no current I, and a logic value "0" (F2=0) of a low level ($e_5$=~Vcc) when the current I flows.

The current sensor 22, has a fail-safe construction in that a signal is not produced in the winding N2, when the signal generator 24 is faulty, or a disconnection fault occurs in the resistor R50, or a disconnection fault occurs in the windings N1, N2. Such a current sensor 22 is disclosed for example in the paper of M. Kato, K. Futsuhara, and M. Mukaidono, entitled "Construction of Magnetic Sensors for Assuring Safety" (Proc. of 2nd International conf. on Human Aspects of Advanced Manufacturing and Hybrid Automation, Honolulu (August 1990)).

A window comparator WC2 is a fail-safe device of the same construction as the beforementioned window comparator WC1, with the output signal $e_4$ (indicating the presence or absence of residual pressure) from the residual pressure sensor of FIG. 2 input commonly to the input terminals A, B. The power source voltage Vs of the window comparator WC2 however is set to be lower than the power source voltage Vcc of the window comparator WC1 (Vs<Vcc). With the window comparator of the circuit configuration of FIG. 3, the respective threshold values of the upper and lower limits are determined in proportion to the power source voltage. Consequently, setting the power source voltage Vs of the window comparator WC2 lower than the power source voltage Vcc of the window comparator WC1, enables the level (Vcc) of logic value "0" (F1=0) of the output signal $e_4$ from the window comparator WC1 to be set within the upper and lower limit threshold value range of the window comparator WC2. As a result, a NOT operation on the logical output F1 from the residual pressure sensor can be executed by the window comparator WC2. Moreover, an upper limit threshold value Th2H and a lower limit threshold value Th2L of the window comparator WC2 are set on either side of the low level Vcc (F1=0) of the output signal $e_4$ from the window comparator WC1. Consequently, the window comparator WC2 generates an output of logic value "0" when the input signal (F1) is logic value "1", and generates an output of logic value "1" when the input signal is logic value "0", thus corresponding to a NOT operating device with the logical relation of the input and output becoming a negative relation (F1=$\overline{F1}$).

Figure 12:
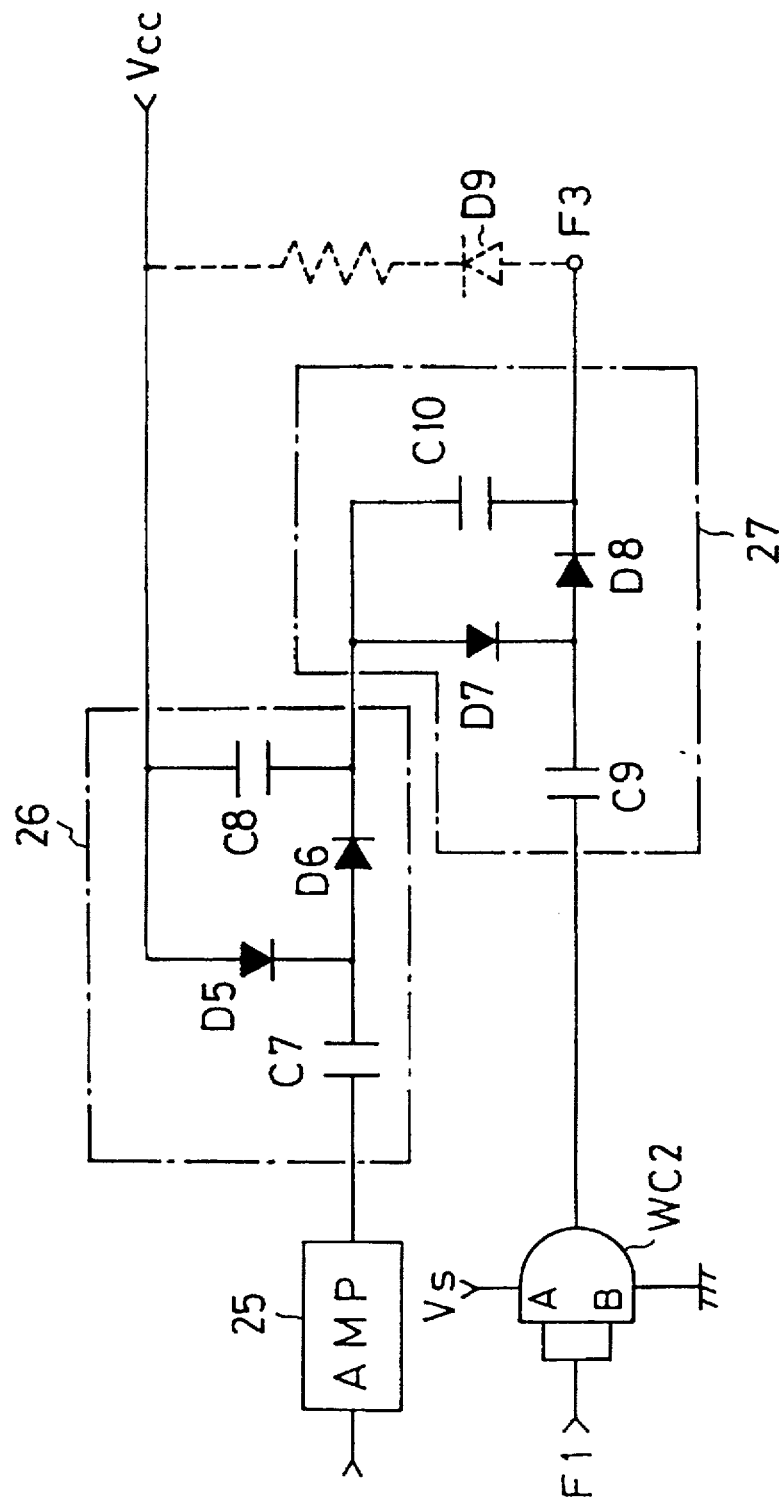
FIG. 12 is a basic circuit diagram of an adding connection section for a current sensor side output and a residual pressure sensor output of the first embodiment according to the second aspect.

A voltage doubler rectifying circuit 27 which serves as a judgement device, has a similar construction to the voltage doubler rectifying circuit 10. The construction however is such that the output signal of the window comparator WC2 is clamped at the output signal $e_5$ from the voltage doubler rectifying circuit 26. FIG. 12 shows the connections for the voltage doubler rectifying circuit 26 and the voltage doubler rectifying circuit 27. In FIG. 12, symbols C7~C10 denote capacitors while symbols D5~D8 denote diodes. If a logical output signal of the output signal $e_6$ from the voltage doubler rectifying circuit 27 is F3, then when the logical outputs of the current sensor 22 and the window comparator WC2 are both "0", then F3=0, and when the logical output of one or the other is "1", then F3=1, while when the logical outputs of both are "1", then F3=2. The voltage doubler rectifying circuit 27 thus has the function of an adding circuit which carries out an logical addition operation on the respective logical outputs of the current sensor 22 and the window comparator WC2.

Figure 13:
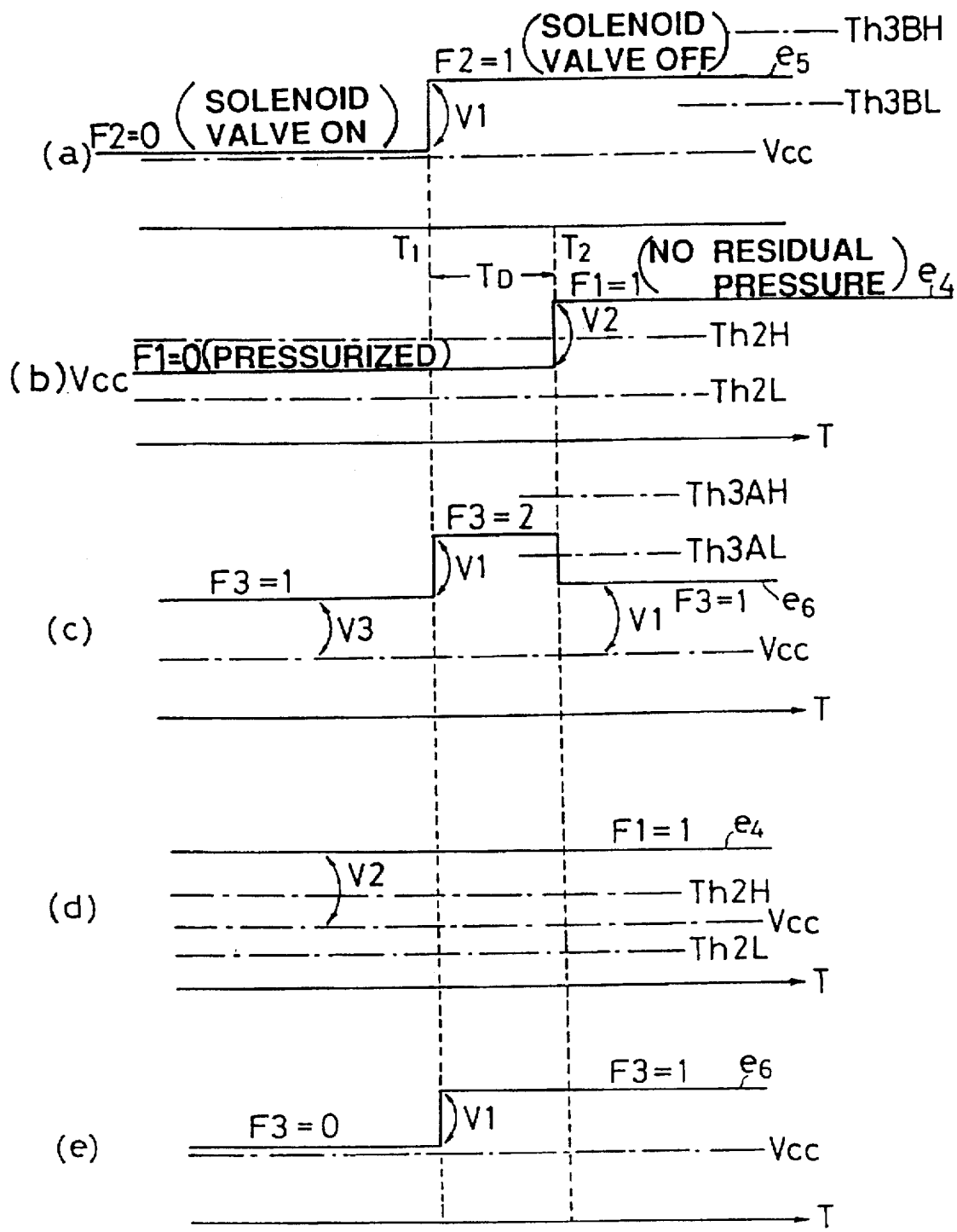
FIG. 13 is a time chart for explaining an operation of the first embodiment according to the second aspect.

Next is a description of the operation, with reference to the time charts of FIG. 13.

In FIG. 13, time chart (a) shows the output signal $e_5$ from the current sensor 22. When the current I flows in the solenoid 21 of the solenoid valve (when the solenoid valve is ON), then the output signal becomes $e_5 \approx$Vcc (logic level F2=0), while when the current I does not flow (when the solenoid valve is OFF), the output signal becomes $e_5 \approx$Vcc+V1 (logic level F2=1). Symbol V1 denotes the output voltage of the current sensor 22 when there is no current I. Time chart (b) shows the output signal $e_4$ from the residual pressure sensor (the output from the voltage doubler rectifying circuit 14 of FIG. 2). In the pressurized condition, $e_4$=Vcc (logic level F1=0), while in the condition with no residual pressure, $e_4$=Vcc+V2 (logic level F1=1). Symbol V2 denotes the output voltage of the residual pressure sensor when there is no residual pressure. Time chart (c) shows the logic level of the output signal $e_6$ from the voltage doubler rectifying circuit 27, which rectifies the output signal of the window comparator WC2. Here, V3 is the output voltage of the window comparator WC2.

When the solenoid valve is switched ON to give the pressurized condition, the current I flows giving a logical output F2=0, with the output signal $e_5$ from the current sensor 22 at a low level ($e_5 \approx$Vcc). At this time, the output signal $e_4$ from the residual pressure sensor becomes F1=0 with a low level ($e_4$=Vcc) indicating a pressure, and since as shown in FIG. 13(b), the threshold value range of the window comparator WC2 is set on either side of the power source voltage Vcc, then the window comparator WC2 gives a logical output $\overline{F1}$=1 (here the symbol "" indicates the logical negation). Consequently, in the pressurized condition, the output signal $e_6$ from the voltage doubler rectifying circuit 27 becomes $e_6$=Vcc+V3, and the logical value of the logical output F3 becomes F3=1. When at time T1 (corresponding to time t1 in FIG. 5), the solenoid valve is switched OFF, the output signal $e_5$ from the current sensor 22 becomes $e_5$=V1+Vcc (logical value of F2=1). However an interval $T_D$ is required until the pressure drops sufficiently for the residual pressure sensor to indicate no residual pressure, and at time T2 (corresponding to time t4 in FIG. 5), the output signal $e_4$ from the residual pressure sensor becomes $e_4$=V2+Vcc (logic value of F1=1). The window comparator WC2 thus generates an oscillating output until time T2. Consequently, with the output signal $e_6$ from the voltage doubler rectifying circuit 27, $e_6$=Vcc+V3 (logical value of F3=1) up until time T1, while between times T1 and T2, $e_6$=Vcc+V1+V3 (logical value of F3=2).

Here, since the logical output F3=2 is produced when $\overline{F1}$=1 and F2=1, then this expresses the logical product output of logical outputs $\overline{F1}$ and F2.

From time T2 onwards, the output signal $e_4$ from the residual pressure sensor becomes $e_4$=Vcc+V2, and since this exceeds the upper limit threshold value Th2H of the window comparator WC2, then the output signal from the window comparator WC2 becomes a low level, and the output signal $e_6$ from the voltage doubler rectifying circuit 27 becomes $e_6$=Vcc+V1 (F3=1). Consequently, when the residual pressure sensor is operating normally, then as shown in FIG. 13(c), the logical output F3 from the voltage doubler rectifying circuit 27 is always F3$\geq$1.

Now, if prior to supplying pressure to the movable section of the machine, a blockage occurs in the pressure inlet 4 of the residual pressure sensor, then the pressure does not flow into the pressure sensing pipe 5, so that the logical output F1 from the residual pressure sensor is always F1=1 ($e_4$=Vcc+V2), and as shown in FIG. 13(d) the upper limit threshold value Th2H of the window comparator WC2 is exceeded, so that an oscillating output is not generated in the window comparator WC2. Therefore, when the solenoid valve is switched ON to pressurize, then as shown in FIG. 13(e), the logical output becomes F3=0 with the output signal $e_6$ from the voltage doubler rectifying circuit 27 at $e_6$=Vcc. When the solenoid valve is switched OFF, the logical output becomes F3=1 due to the output from the current sensor 22.

Hence with the circuit of FIG. 11, in the case of a blockage in the residual pressure sensor at the point when the solenoid valve is switched ON to pressurize, then an output corresponding to a logic value of F3=0 is produced. It can thus be known if there is a blockage in the residual pressure sensor, by judging if an output corresponding to a logic value of F3=0 has been produced in the logical output F3 from the voltage doubler rectifying circuit 27. Consequently, with systems using pressure, it can be verified at the time of system operation, whether or not a residual pressure sensor is able to indicate danger, and hence if subsequent operations can be carried out. The safety of systems using pressure can thus be improved.

The logical structure of FIG. 11 can be expressed by the following equation:

$$F3 = F2 + \overline{F1} \quad (4)$$

where symbol "+" indicates addition.

Since the logical variable F2 expresses the presence or absence of the current I of the solenoid 21, then expressing the presence of current I as "1" and the absence as "0" gives:

$$F2=\bar{I} \tag{5}$$

Equation (4) can thus be expressed as:

$$F3=\bar{I}+\overline{F1} \tag{6}$$

Figures 14, 15:
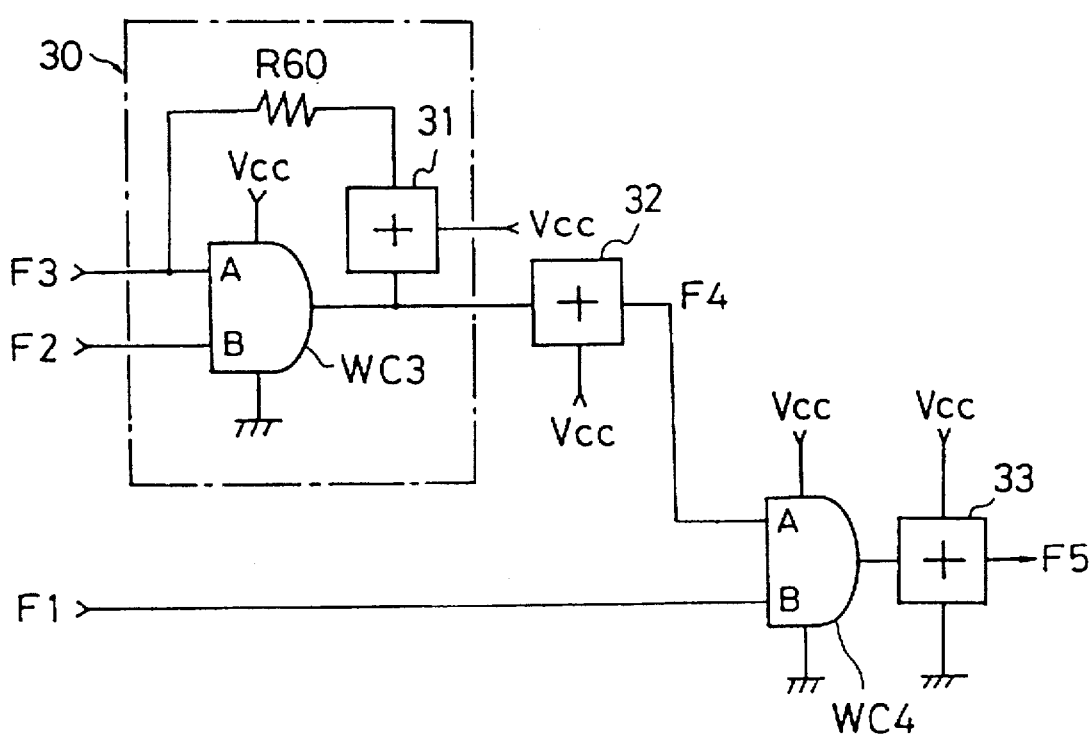
FIG. 14 is a truth table illustrating a logical relation between a logical output related to a current flow condition, and a logical output related to a pressure supply condition.
FIG. 15 is a circuit diagram of a second embodiment of a residual pressure sensor monitoring apparatus of the present invention.

FIG. 14 shows a truth table for the logical outputs $\bar{I}$ and $\overline{F1}$.

The combination of $\bar{I}=0$ and $\overline{F1}=1$ giving F3=1, indicates the detection of a pressure when a current flows in the solenoid 21, while the combination of $\bar{I}=1$, $\overline{F1}=0$ giving F3=1, indicates the non detection of a pressure when a current does not flow in the solenoid 21, both indicating that the residual pressure sensor is operating normally. The combination of $\bar{I}=1$, $\overline{F1}=1$ giving F3=2, indicates that the operator has switched the solenoid valve OFF but a pressure still remains, being a normal operation of the circuit.

The combination of $\bar{I}=0$ and $\overline{F1}=0$ giving F3=0, indicates that the residual pressure sensor cannot show a pressurized condition in spite of a current flowing in the solenoid 21. Such a phenomena is produced by blockage of the pressure inlet 4 of the residual pressure sensor.

Accordingly, if the current sensor and the residual pressure sensor are normal, then F3≦1 indicates normal operation of residual pressure detection. This normal operation can be displayed for example using a display diode D9 as shown by the dotted line of FIG. 12.

With the circuit of FIG. 11, in the case wherein a blockage occurs during an established pressurised condition, then since an output (F1=0) for residual pressure is generated even after switching OFF the solenoid valve, the output F3=0 does not eventuate, resulting in a dangerous situation wherein a logical output indicating a normal residual pressure sensor is generated. Consequently, with a system wherein there is danger if the residual pressure has not become completely zero even though the operator has switched off the solenoid, it is necessary to verify that the logical output from the residual pressure sensor has become F1=1 (no residual pressure).

FIG. 15 is a circuit to solve this problem, being a circuit of a second embodiment which verifies, after switching off the solenoid valve, that there is no blockage in the residual pressure sensor, and generates a verification output for no residual pressure.

In FIG. 15, a window comparator WC3 has a similar construction to the window comparator WC1 of FIG. 2, and constitutes, together with a rectifying circuit 31, a self hold circuit 30 serving as a second logical product operating device, with a logical output F3 (output from the voltage doubler rectifying circuit 27 of FIG. 11) input to an input terminal A as a trigger input, and a logical output F2 (output from the current sensor 22) input to an input terminal B as a reset input. An upper limit threshold value Th3AH and a lower limit threshold value Th3AL of the input terminal A, are set as shown in FIG. 13(c), on either side of a logic level of logical output F3=2 ($e_6$=Vcc+V1+V3). An upper limit threshold value Th3BH and a lower limit threshold value Th3BL of the input terminal B are set as shown in FIG. 13(a), on either side of a logic level of logical output F2=1 ($e_5$=Vcc+V1).

Figure 16:
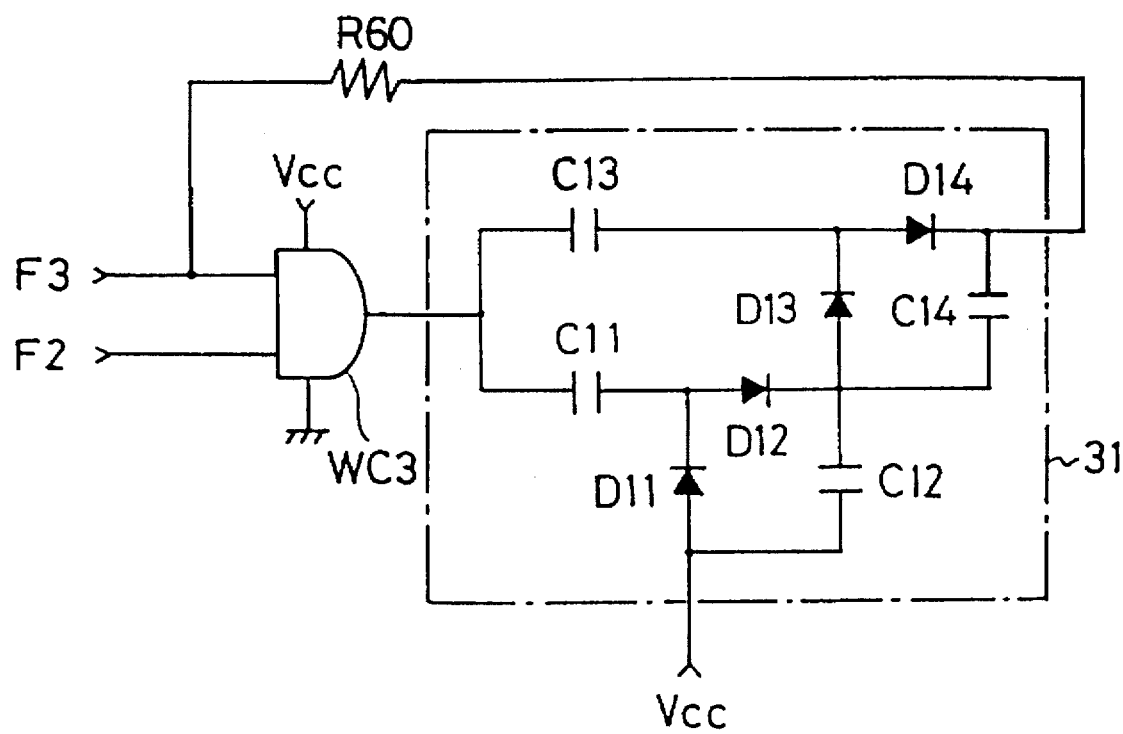
FIG. 16 is a circuit diagram of a rectifying circuit in a self hold circuit in the second embodiment.

As shown in FIG. 16, the rectifying circuit 31 comprises capacitors C11~C14 and diodes D11~D14, and is constructed with two of the voltage doubler rectifying circuits 10 shown in FIG. 2, connected together by a similar method to that of FIG. 12. This is because the lower limit threshold value Th3AL of the input terminal A is a high level, making it necessary to produce a feedback voltage higher than this lower limit threshold value Th3AL. This feedback voltage is adjusted by a resistor R60 to be set the level to within the threshold value range of the input terminal A.

With the self hold circuit 30, when a logic value of F2=1 is generated with switching OFF the solenoid, and a logic value of F3=2 is simultaneously generated if the residual pressure sensor is normal, then an alternating current output signal is produced from the window comparator WC3. This output signal is rectified by the rectifying circuit 31 and fed back via the resistor R60 to the input terminal A at a level within the threshold value range thereof. Therefore, even if the signal F3 input to the input terminal A becomes a logic value of F3<2 (subsequent to time T2 of FIG. 13), then as long as a logic value of F2=1 is being input to the input terminal B, an output is produced and self held. Furthermore the self hold circuit 30 has a fail-safe construction since in a worst case scenario with a fault in the window comparator WC3, a disconnection fault in the feedback resistor R60, and a fault in the rectifying circuit 31, then either the alternating current output from the window comparator WC3 is not produced, or the self hold function is lost.

Such a fail-safe self hold circuit wherein the oscillating output signal is rectified and fed back to the input terminal is disclosed in U.S. Pat. 5,027,114. Having the trigger condition for the self hold circuit 30 as F3≦2, is functionally the same as having the self hold circuit 30 triggered with input terminal A having the logical product of the signal $\overline{F1}$ and the signal F2.

A rectifying circuit 32 has a similar construction to the voltage doubler rectifying circuit 10 of FIG. 2, giving an output of logical output F4=1 with the alternating current output signal of the window comparator WC3 clamped at the power source voltage Vcc. A window comparator WC4 serving as the third logical product operating device, has the logical output F4 from the rectifying circuit 32 input to one input terminal A and the logical output F1 from the residual pressure sensor input to the other input terminal B, carrying out a logical product operation on both to generate an alternating current output signal when both logical outputs F4 and F1 are "1" (F4=1, F1=1). A rectifying circuit 33 clamps the alternating current output signal of the window comparator WC4 at the power source voltage Vcc and rectifies, outputting the logical product output of the logical outputs F4 and F1 as F5.

With the circuit of FIG. 15, after the solenoid valve is switched OFF and the residual pressure sensor detects the residual pressure condition (giving F1=0), then until a sufficient drop in the residual pressure is detected (giving F1=1), F5=1 is not generated. In a worst case scenario where a blockage occurs during an established pressurised condition, and a fault occurs in another circuit such as that of the current sensor 22, the residual pressure sensor, or the rectifying circuit, then a logical output F5=1 indicating no residual pressure is not produced.

Figure 17:
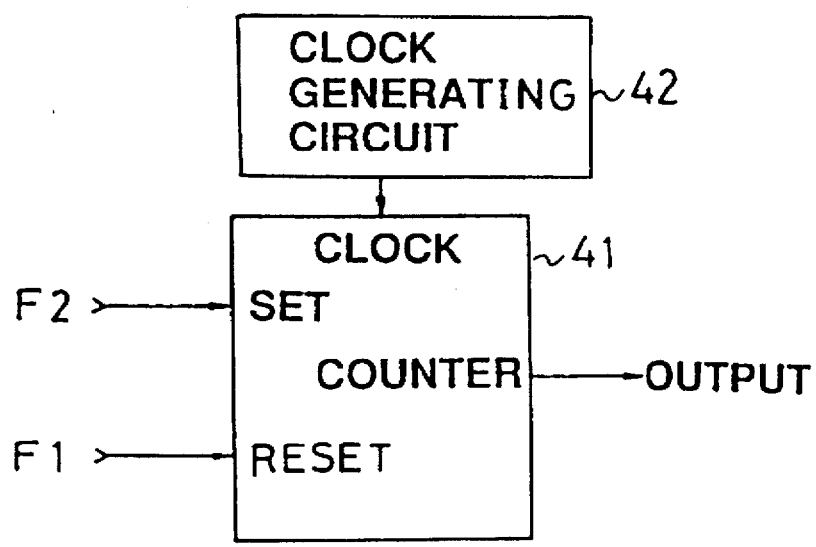
FIG. 17 is a circuit diagram of a third embodiment of a residual pressure sensor monitoring apparatus of the present invention.

With the construction of a third embodiment as shown in FIG. 17, the output F2 from the current sensor 22 is input to a set input of a counter 41, and the output F1 from the residual pressure sensor is input to a reset input. The timing of a clock signal from a clock generating circuit 42 is started with the input of F2=1 from the current sensor 22 indicating that the solenoid valve is OFF, and is stopped with the input of F1=1 from the residual pressure sensor indicating no residual pressure, and the timing value output from the counter 41 at that time is then displayed. In this way, the time from switching off the solenoid valve until generation of an output for no residual pressure can be displayed. Hence, if the time from switching off the solenoid valve until generation of an output for no residual pressure is too long, then it can be known that operation of the pressure sensing pipe 5 has become sluggish due for example to deterioration.

With the construction wherein as shown in FIG. 12, the logical output F3 from the circuit of FIG. 11 is used for displaying the operating condition of the sensor, since in the event of a fault in the residual pressure sensor, F1=0 is generated, then there is the problem that if the logical output becomes F3≧1, there will be no display for a fault in the residual pressure sensor.

Figure 18:
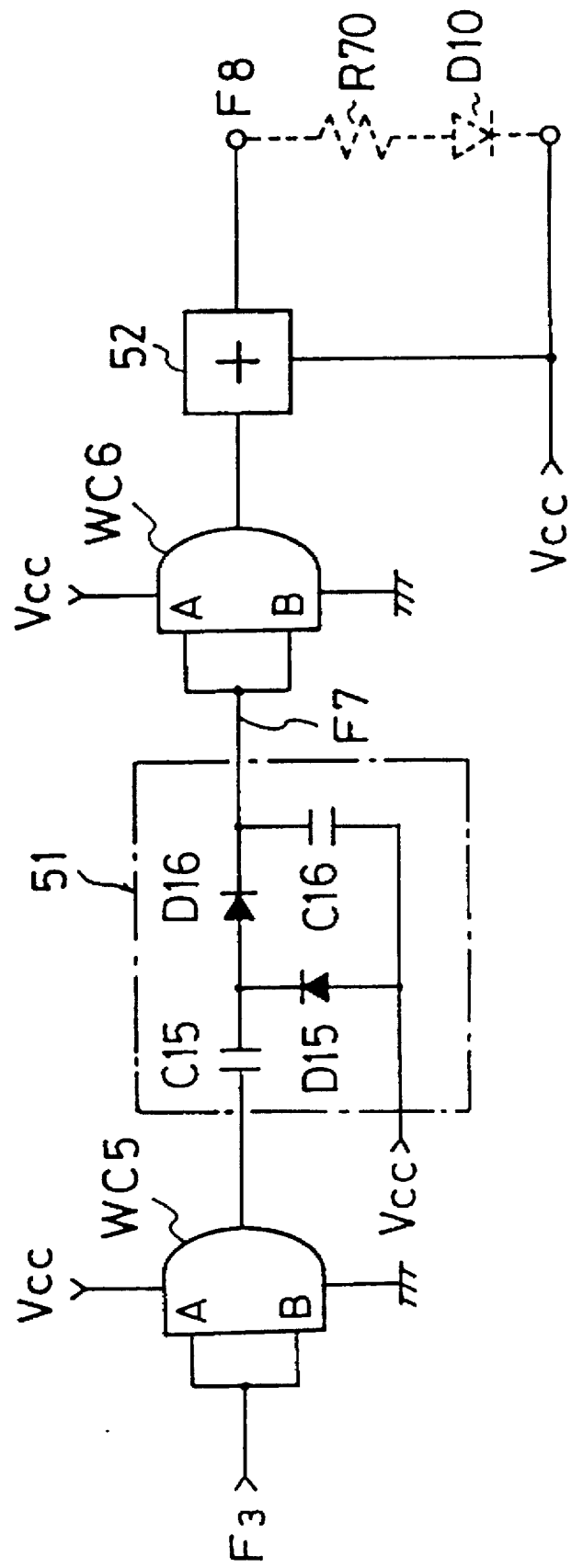
FIG. 18 is a circuit diagram of a fourth embodiment of a residual pressure sensor monitoring apparatus of the present invention.

FIG. 18 shows a circuit of a fourth embodiment to cope with this problem.

In FIG. 18, first and second window comparators WC5, WC6 have the fail-safe circuit construction as shown in FIG. 3. The window comparator WC5, has the logical output F3 from the voltage doubler rectifying circuit 27 of FIG. 11 input commonly to input terminals A and B. The window comparator WC6, has an output from the window comparator WC5 which has been rectified by a voltage doubler rectifying circuit 51 (giving a logical output F7), input commonly to input terminals A and B. An output from the window comparator WC6 is rectified by a voltage doubler rectifying circuit 52, and the rectified output is output as a logical output F8.

The voltage doubler rectifying circuit 51 which comprises two capacitors C15, C16 and two diodes D15, D16, clamps the output from the window comparator WC5 at the power source voltage Vcc, and generates an output F7. However, since the electrostatic capacity of the smoothing capacitor C16 is set considerably larger than that of the coupling capacitor C15, the falling response of the output F7 is slowed down. That is to say, the voltage doubler rectifying circuit 51 has an off-delay function and corresponds to the off-delay device.

The voltage doubler rectifying circuit 52 is the same as the voltage doubler rectifying circuit 10 of FIG. 2.

Figure 19:
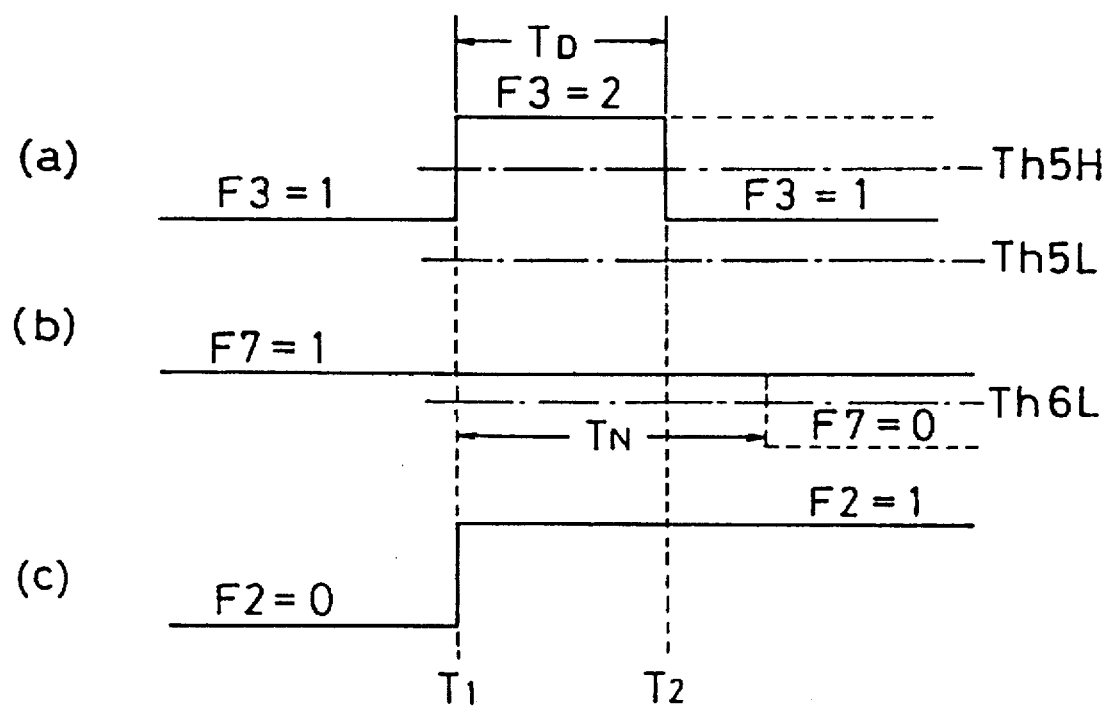
FIG. 19 is a time chart for explaining an operation of the fourth embodiment of the residual pressure sensor monitoring apparatus.

The operation will now be described with reference to the time chart of FIG. 19.

First is a description of the case wherein the residual pressure sensor and the circuit of FIG. 11 are normal.

The output F3 from the circuit of FIG. 11, as shown in FIG. 19(a), is F3=1 until the solenoid valve is switched OFF at time T1. Then from switching OFF the solenoid valve giving F2=1 as shown in FIG. 19(c) until time T2 where an output is generated for no residual pressure in the residual pressure sensor, the output is F3=2, and after generation of the output for no residual pressure in the residual pressure sensor, this becomes F3=1. Since as shown in FIG. 19(a), an upper limit threshold value Th5H and a lower limit threshold value Th5L of the window comparator WC5 are set on either side of F3=1, then during a period $T_D$ between time T1 and time T2, the oscillating output from the window comparator WC5 ceases and the output becomes a low level. Here, since the capacity of the capacitor C16 of the voltage doubler rectifying circuit 51 is set so as to have a delay time $T_N$ which is longer than the period $T_D$ between times T1 and T2 ($T_N>T_D$), then as shown in FIG. 19(b), the voltage doubler rectifying circuit 51 also continuously generates a high level output signal F7 (shown as a logic value F7=1) during the period $T_D$. Once the period $T_D$ has elapsed, then after this the output becomes F3=1 due to the output F1=1 indicating no residual pressure in the residual pressure sensor, and an alternating current output signal is again generated from the window comparator WC5.

Accordingly, as long as the circuit of FIG. 11, and the residual pressure sensor are normal, then as shown by the full line in FIG. 19(b), the output F7 from the voltage doubler rectifying circuit 51 remains at F7=1. Since a lower limit threshold value Th6L of the window comparator WC6 is set as shown in FIG. 19(b), to a value lower than the logic level indicated by logic value F7=1, then in this case, an alternating current output is continuously produced from the window comparator WC6, and a high level logic value output F8=1 higher than the power source voltage Vcc indicating a normal situation, is continuously produced from the voltage doubler rectifying circuit 52.

Next is a description of a case wherein the residual pressure sensor is faulty.

When at the time of pressurization the residual pressure sensor is faulty, then the output from the residual pressure sensor does not become F1=0, and as shown by the dotted line in FIG. 19(a), F3=2 continues on even after time T2. Therefore after the oscillating output from the window comparator WC5 has stopped at time T1, once the delay time $T_N$ of the voltage doubler rectifying circuit 51 has elapsed, the output F7 from the voltage doubler rectifying circuit 51, as shown by the dotted line of FIG. 19(b), becomes a level corresponding to logic value F7=0. The output from the window comparator WC6 thus ceases, and the output from the voltage doubler rectifying circuit 52 becomes a low level (power source voltage Vcc) with F8=0.

Moreover, if at the point of switching ON the solenoid valve, a blockage has already occurred in the residual pressure sensor, then the output F1 from the residual pressure sensor does not become F1=0, so that F7 =0 prior to time T1, resulting in F8=0. Furthermore with the circuit of FIG. 18, if a fault occurs in one or other of the circuits of FIG. 2 and FIG. 11, the output becomes F8=0.

If for example as shown by the dotted line in FIG. 18, a resistor R70 and a display diode D10 are connected to the output side of the voltage doubler rectifying circuit 52, such that the display diode D10 comes on with an output of F8=1 and goes off when F8=0, then as well as being able to warn of a fault in the residual pressure sensor, it is also possible to give a warning at the time of a fault in other circuits.

The circuits of FIG. 11 and FIG. 15 can also be applied to a construction for detecting residual pressure with a pressure switch using a diaphragm, instead of the pressure sensing pipe (Bourdon tube). Here the construction may be such that at the time of no pressure the electrical contacts come ON (F1=1) while at the time of pressure, the electrical contacts go OFF (F1=0). In this case a blockage in the Bourdon tube is equivalent to a puncture of the diaphragm, with the pressure switch not going OFF even though the solenoid valve is switched ON.

Moreover, with the respective embodiments, a two input fail-safe window comparator is used for the window comparators WC2, WC5, and WC6, which are commonly supplied with the input signals. However a single input window comparator can also obviously be used. A single input window comparator is disclosed for example in U.S. Pat. No. 5,027,114.

Furthermore, with regards to the blockage location, this has been described as being at the pressure inlet of the residual pressure sensor. However, this can obviously be dealt with in the same manner if it is in the pressure supply pipe between the solenoid valve and the residual pressure sensor attachment portion.

Also, with the respective embodiments, since the lower limit threshold values of the respective window comparators are higher than the power source voltage Vcc, then the output voltage of the rectifying circuit is clamped at the power source voltage Vcc and output. However if in general, a method is used wherein the alternating current signal is rectified after using transformer coupling, then by appropriately designing the winding ratio of the primary and secondary windings of the transformer, it is possible to optionally output a voltage which reaches the threshold value of the window comparator. Therefore in this case it is not altogether necessary to clamp the rectified output signal at the power source voltage.

With the residual pressure sensor of the present invention as described above, an output indicating no residual pressure is not produced until the residual pressure has completely gone and the movement of the closed end of the pressure sensing pipe has stopped. Therefore if applied to a dangerous system wherein a residual pressure remains even though the pressure supply has stopped, then the safety of the system can be improved.

Moreover, with the residual pressure sensor monitoring apparatus of the present invention, since it is possible to reliably warn of a blockage in the residual pressure sensor, or a fault in the sensor, then with systems wherein detection of no residual pressure is carried out using a residual pressure sensor, operator safety can be considerably improved.

INDUSTRIAL APPLICABILITY

The present invention can reliably verify that there is no residual pressure in a system using hydraulically powered machinery, as well as being able to warn of a fault in the residual pressure sensor. Hence operator safety can be ensured and industrial applicability is thus considerable.

We claim:

1. A residual pressure sensor incorporating a pressure sensing pipe with one end closed such that the closed end is displaced with an increase/decrease in pressure introduced from another end opening, and a pressure-electricity converter section which detects the displacement location of the closed end of the pressure sensing pipe and at the time of a pressure increase, decreases an electrical output in accordance with displacement of the closed end, and at the time of a pressure decrease, increases an electrical output in accordance with displacement of the closed end comprising;

an electrical output change detection means for detecting whether or not the electrical output from said pressure-electricity converter section has a changing condition, and generating a low level output in the event of a changing condition, and a high level output in the event of a constant condition, and a fail-safe first logical product operating means for carrying out a logical product operation on an output from said electrical output change detection means and an output from said pressure-electricity converter section, and generating an output of logic value "1" corresponding to a high level indicating no residual pressure, when both outputs are at a high level equal to or above a predetermined value, and generating an output of logic value "0" corresponding to a low level, at the time of a fault.

2. A residual pressure sensor according to claim 1, wherein said pressure-electricity converter section comprises;

a plate having a slit and fixed to said pressure sensing pipe closed end so as to be displaced in accordance with displacement of said closed end, a light sensor incorporating a light emitting element and a light receiving element oppositely disposed with said plate therebetween, a first signal generator for supplying an alternating current signal to the light emitting element of said light sensor to generate an alternating current light beam, and a first rectifying circuit for clamping at a power source voltage and rectifying, an alternating current output from said light sensor, the construction being such that when a pressure in said pressure sensing pipe is equal to or less than a predetermined pressure, a light beam from said light emitting element is received by said light receiving element via said slit.

3. A residual pressure sensor according to claim 2, wherein a vibrating element is fitted to said plate to vibrate said plate in a direction substantially perpendicular to direction of light emission from the light emitting element to modulate the light beam emitted from the light emitting element.

4. A residual pressure sensor according to claim 1, wherein said pressure-electricity converter section comprises;

a plate fixed to said pressure sensing pipe closed end so as to be displaced in accordance with displacement of said closed end, a light sensor incorporating and a light emitting element and light receiving element provided to one side of said plate, a first signal generator for supplying an alternating current signal to the light emitting element of said light sensor to generate an alternating current light beam, and a first rectifying circuit for clamping at a power source voltage and rectifying, an alternating current output from said light sensor, the construction being such that when a pressure in said pressure sensing pipe is equal to or less than a predetermined pressure, the light beam from said light emitting element is reflected by said plate and received by said light receiving element.

5. A residual pressure sensor according to claim 1, wherein there is provided; two pressure-electricity converter sections which respectively generate electrical output signals of a high level at the time of pressure levels equal to or less than mutually different first and second pressure levels, and a first self hold circuit with an output from the pressure-electricity converter section which generates an electrical output signal at pressure levels equal to or less than the first pressure level, as a trigger input signal, and an output from the pressure-electricity converter section which generates an electrical output signal at pressure levels equal to or less than the second pressure level which is higher than the first pressure level, as a reset input signal, and which self holds the trigger input signal.

6. A residual pressure sensor according to claim 1, wherein said electrical output change detection means comprises;

a second signal generating means for superimposing a high frequency alternating current signal on an output from the pressure-electricity converter section, an amplifying means into which is input by way of a coupling capacitor, the output from the pressure-electricity converter section on which is superimposed the high frequency alternating current signal of said second signal generating means, and wherein the amplified output is saturated when the output from the pressure-electricity converter section is in a changing condition, and a second rectifying circuit for clamping the alternating current amplified output from said amplifying means at the power source voltage and rectifying, the construction being such that the rectified output from said second rectifying circuit is output to said first logical product operating means.

7. A residual pressure sensor according to claim 1, wherein said first logical product operating means is constructed of a fail-safe window comparator having two input terminals, which generates an alternating current output higher than the power source voltage when each of the input signals input to the respective input terminals are equal to or above a previously set lower limit threshold value, and which generates an output of logic value "0" at the time of a fault.

8. A residual pressure sensor monitoring apparatus, applicable to a system incorporating a pressure supply control means for carrying out pressure supply to a movable section of a machine at the time of electrical power supply and for stopping pressure supply at the time of no electrical power supply, which monitors that there is no pressure supply to said movable section of the machine using a residual pressure sensor incorporating a pressure sensing pipe with one end closed such that the closed end is displaced with an increase/decrease in pressure introduced from another end opening, and a pressure-electricity converter section which detects the displacement location of the closed end of the pressure sensing pipe and at the time of a pressure increase, decreases an electrical output in accordance with displacement of the closed end, and at the time of a pressure decrease, increases an electrical output in accordance with displacement of the closed end, said residual pressure sensor monitoring apparatus being for monitoring if the operation condition of said residual pressure sensor is normal or abnormal, said residual pressure sensor monitoring apparatus comprising;
- a current sensor which monitors the electrical power supply condition of said pressure supply control means, and generates a low level output of logic value "0" at the time of electrical power supply, and generates a high level output of logic value "1" at the time of no electrical power supply, and generates an output of logic value "0" at the time of a fault,
- a fail-safe NOT operating means which carries out a NOT operation on the logical output from said residual pressure sensor, which generates a low level output of logic value "0" at the time of supply pressure to the movable section of the machine, and a high level output of logic value "1" at the time of no supply pressure, and generates an output of logic value "0" at the time of a fault, and which generates a low level output of logic value "0" at the time of a fault, and
- judgement means for judging if there is a residual pressure sensor fault based on respective logical outputs from said current sensor and said NOT operating means, and when both logical outputs are logic value "0", generates a low level output of logic value "0" indicating a fault in the residual pressure sensor.

9. A residual pressure sensor monitoring apparatus according to claim 8, wherein said NOT operating means comprises a fail-safe window comparator which generates a high level output of logic value "1" when the input level input to an input terminal is within a previously set upper and lower threshold value range, and generates an output of logic value "0" at the time of a fault, said upper and lower threshold values being set on either side of an output level of logic value "0" of said residual pressure sensor.

10. A residual pressure sensor monitoring apparatus according to claim 8, wherein said judgement means is an adding circuit which carries out an addition operation on the respective logical outputs of said current sensor and said NOT operating means.

11. A residual pressure sensor monitoring apparatus according to claim 10, wherein said adding circuit is a rectifying circuit which clamps an output from said NOT operating means at an output level of said current sensor, and rectifies.

12. A residual pressure sensor monitoring apparatus according to claim 8, wherein said current sensor comprises,
- a saturable magnetic body core wound with three windings, namely first second and third windings which becomes saturated when a drive current to said pressure supply control means flows in said third winding,
- a second signal generator for supplying a high frequency signal to said first winding,
- an AC amplifier connected to said second winding for amplifying a signal received by said second winding, and
- a third rectifying circuit for clamping an output from said AC amplifier at the power source voltage, and rectifying and outputting.

13. A residual pressure sensor monitoring apparatus according to claim 8, wherein there is provided a second logical product operating means for carrying out a logical product operation on the output from said judgement means and the output from said current sensor, and a third logical product operating means for carrying out a logical product operation on the output from said second logical product operating means and the output from said residual pressure sensor, and the output from said third logical product operating means is made the residual pressure sensor fault judgement output.

14. A residual pressure sensor monitoring apparatus according to claim 13, wherein when said judgement means is an adding circuit, said second logical product operating means comprises a fail-safe self hold circuit which self holds with the output from said current sensor as a reset input and the output from said adding circuit as a trigger input, and which generates an output of logic value "0" at the time of a fault.

15. A residual pressure sensor monitoring apparatus according to claim 8, wherein said judgement means is an adding circuit, and there is provided;
- a fail-safe first window comparator with upper and lower threshold values set on either side of an intermediate value of an addition output from said adding circuit, which generates a high level output of logic value "1" when an addition output within the threshold value range is input, and which generates an output of logic value "0" at the time of a fault,
- an off-delay means which time delays a drop in the output from said first window comparator to longer than a period from when the current sensor generates an output indicating no current until the residual pressure sensor generates an output indicating no residual pressure, and
- a second window comparator which generates an output of logic value "0" indicating a residual pressure sensor fault when the output from said off-delay means is lower than a predetermined level.

16. A residual pressure sensor monitoring apparatus according to claim 8, wherein a counter is provided which counts a clock signal at the time of inputting an output from the current sensor of a logic value of "1" indicating no current, and stops counting at the time of inputting an output from the residual pressure sensor of logic value "1" indicating no pressure.

17. A residual pressure sensor monitoring apparatus according to claim 8, wherein said residual pressure sensor comprises;

an electrical output change detection means for detecting whether or not the electrical output from said pressure-electricity converter section has a changing condition, and generating a low level output in the event of a changing condition, and a high level output in the event of a constant condition, and a fail-safe first logical product operating means for carrying out a logical product operation on an output from said electrical output change detection means and an output from said pressure-electricity converter section, and generating an output of logic value "1" corresponding to a high level indicating no residual pressure, when both outputs are at a high level equal to or above a predetermined value, and generating an output of logic value "0" corresponding to a low level, at the time of a fault.

18. A residual pressure sensor monitoring apparatus according to claim 17, wherein said pressure-electricity converter section comprises;

a plate having a slit and fixed to said pressure sensing pipe closed end so as to be displaced in accordance with displacement of said closed end, a light sensor incorporating and a light emitting element and a light receiving element oppositely disposed with said plate therebetween, a first signal generator for supplying an alternating current signal to the light emitting element of said light sensor to generate an alternating current light beam, and a first rectifying circuit for clamping at a power source voltage and rectifying, an alternating current output from said light sensor, the construction being such that when a pressure in said pressure sensing pipe is equal to or less than a predetermined pressure, a light beam from said light emitting element is received by said light receiving element via said slit.

19. A residual pressure sensor monitoring apparatus according to claim 18, wherein a vibrating element is fitted to said plate to vibrate said plate in a direction substantially perpendicular to direction of light emission from the light emitting element to modulate the light beam emitted from the light emitting element.

20. A residual pressure sensor monitoring apparatus according to claim 17, wherein said pressure-electricity converter section comprises;

a plate fixed to said pressure sensing pipe closed end so as to be displaced in accordance with displacement of said closed end, a light sensor incorporating and a light emitting element and light receiving element provided to one side of said plate, a first signal generator for supplying an alternating current signal to the light emitting element of said light sensor to generate an alternating current light beam, and a first rectifying circuit for clamping at a power source voltage and rectifying, an alternating current output from said light sensor, the construction being such that when a pressure in said pressure sensing pipe is equal to or less than a predetermined pressure, the light beam from said light emitting element is reflected by said plate and received by said light receiving element.

21. A residual pressure sensor monitoring apparatus according to claim 17, wherein there is provided;

two pressure-electricity converter sections which respectively generate electrical output signals of a high level at the time of pressure levels equal to or less than mutually different first and second pressure levels, and a first self hold circuit with an output from the pressure-electricity converter section which generates an electrical output signal at pressure levels equal to or less than the first pressure level, as a trigger input signal, and an output from the pressure-electricity converter section which generates an electrical output signal at pressure levels equal to or less than the second pressure level which is higher than the first pressure level, as a reset input signal, and which self holds the trigger input signal.

22. A residual pressure sensor monitoring apparatus according to claim 17, wherein said electrical output change detection means comprises;

a second signal generating means for superimposing a high frequency alternating current signal on an output from the pressure-electricity converter section, an amplifying means into which is input by way of a coupling capacitor, the output from the pressure-electricity converter section on which is superimposed the high frequency alternating current signal of said second signal generating means, and wherein the amplified output is saturated when the output from the pressure-electricity converter section is in a changing condition, and a second rectifying circuit for clamping the alternating current amplified output from said amplifying means at the power source voltage and rectifying, the construction being such that the rectified output from said second rectifying circuit is output to said first logical product operating means.

23. A residual pressure sensor monitoring apparatus according to claim 17, wherein said first logical product operating means is constructed of a fail-safe window comparator having two input terminals, which generates an alternating current output higher than the power source voltage when each of the input signals input to the respective input terminals are equal to or above a previously set lower limit threshold value, and which generates an output of logic value "0" at the time of a fault.

* * * * *